(12) United States Patent
Kita

(10) Patent No.: US 6,703,918 B1
(45) Date of Patent: Mar. 9, 2004

(54) PORTABLE INFORMATION EQUIPMENT, AUTHENTICATION DEVICE, AUTHENTICATION SYSTEM AND AUTHENTICATION METHOD

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 514 days.

(21) Appl. No.: 09/651,441

(22) Filed: Aug. 30, 2000

(30) Foreign Application Priority Data

Dec. 9, 1999 (JP) .......................................... 11-349764

(51) Int. Cl.$^7$ .............................. H04B 1/00; H04K 1/00
(52) U.S. Cl. .................... 340/5.52; 340/5.53; 340/5.82; 340/5.83; 340/5.84; 705/67
(58) Field of Search .............................. 340/5.51, 5.52, 340/5.53, 5.82, 5.83, 5.84, 573.1; 713/186; 705/16, 18, 26, 39, 44, 65, 67

(56) References Cited

U.S. PATENT DOCUMENTS

| | | | | |
|---|---|---|---|---|
| 5,229,764 A | * | 7/1993 | Matchett et al. | 340/5.52 |
| 5,867,795 A | * | 2/1999 | Novis et al. | 455/566 |
| 5,917,913 A | * | 6/1999 | Wang | 713/186 |
| 6,104,922 A | * | 8/2000 | Baumann | 455/410 |
| 6,256,737 B1 | * | 7/2001 | Bianco et al. | 713/186 |
| 6,346,886 B1 | * | 2/2002 | De La Huerga | 340/573.1 |
| 6,507,662 B1 | * | 1/2003 | Brooks | 340/5.52 |

* cited by examiner

Primary Examiner—Brian Zimmerman
Assistant Examiner—Clara Yang
(74) Attorney, Agent, or Firm—Frishauf, Holtz, Goodman & Chick, P.C.

(57) ABSTRACT

Portable information equipment has a device attachment detection section which detects whether or not a device is attached to a human body, an authentication data input section which inputs authentication data while the device is attached to the human body, a storage section which stores the authentication data inputted by the authentication data input section, a transmission section which transmits, the authentication data stored by the storage section, and an authentication data clear section which clears the authentication data stored by the storage section if the device attachment detection section detects that the device has been detached from the human body. After authentication data is inputted and stored in the portable information equipment, the authentication data can be transmitted by operating a switch once. Further, if the portable information equipment is detached from the human body, the authentication data is cleared. Thus, security can be ensured sufficiently.

18 Claims, 28 Drawing Sheets

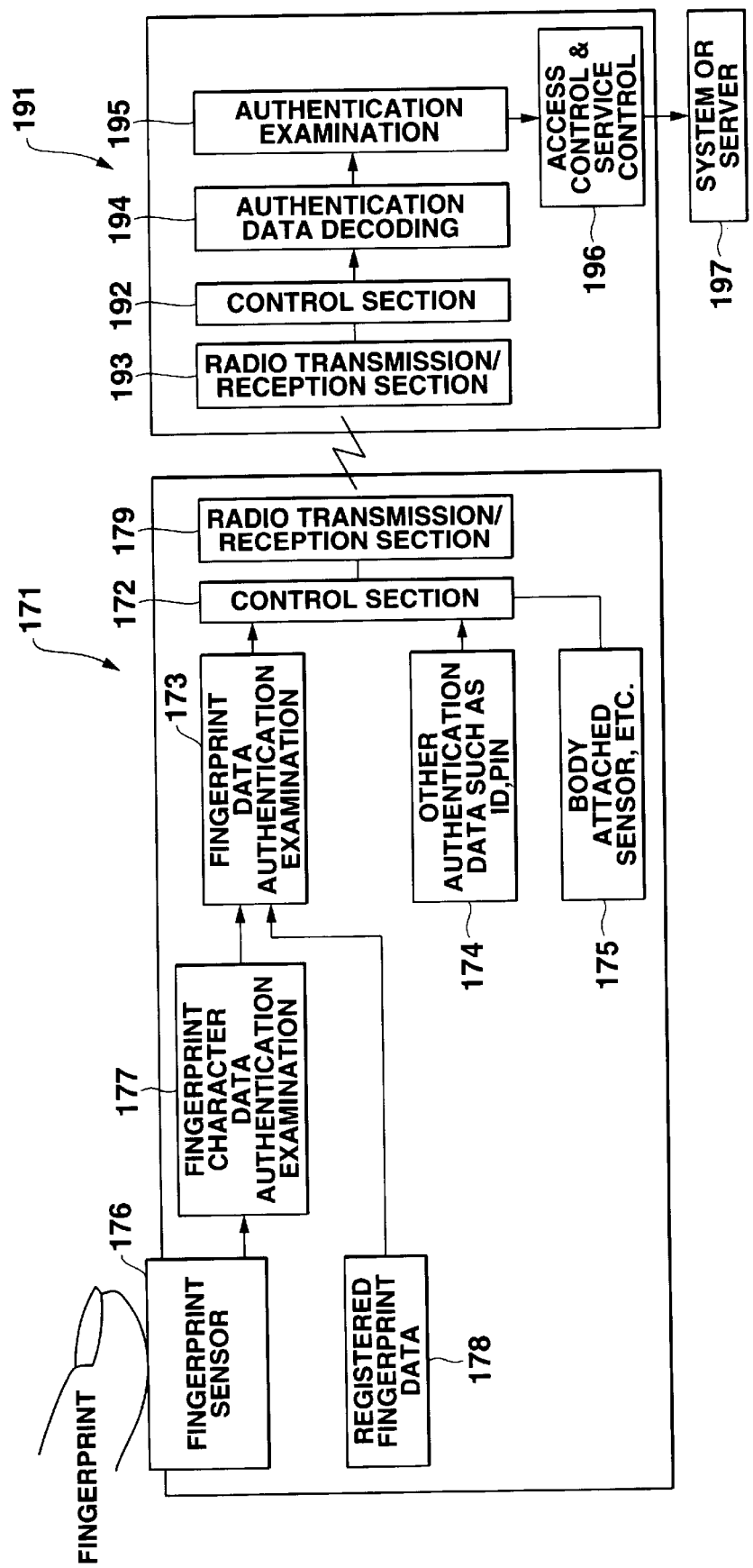

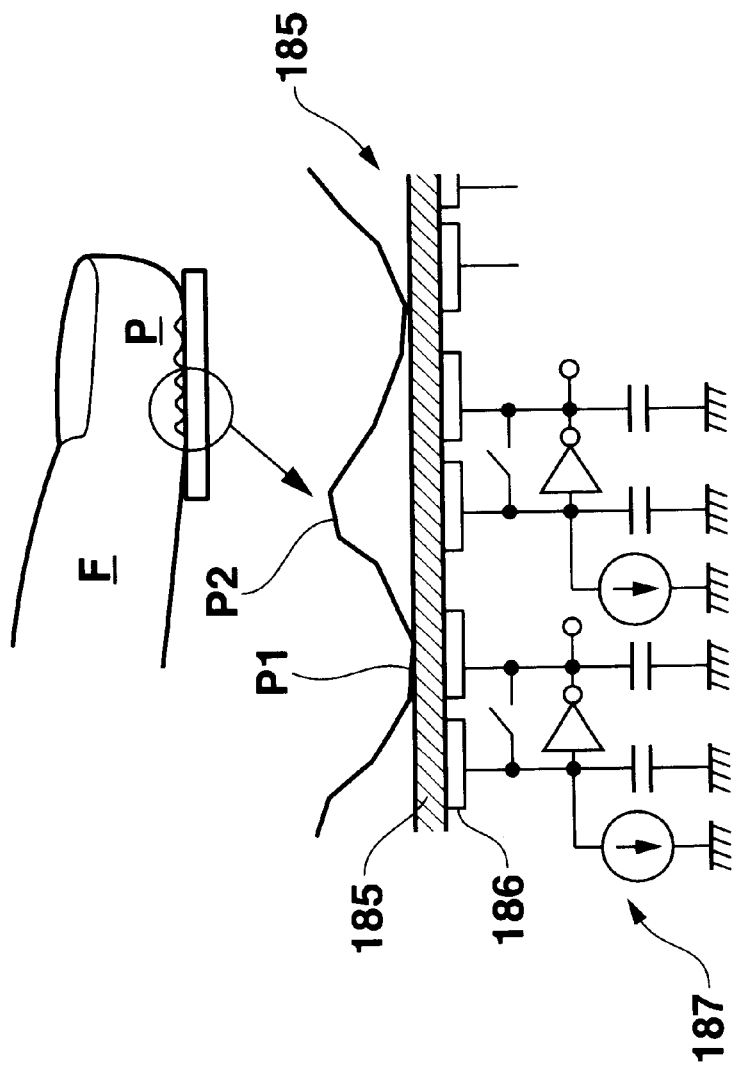
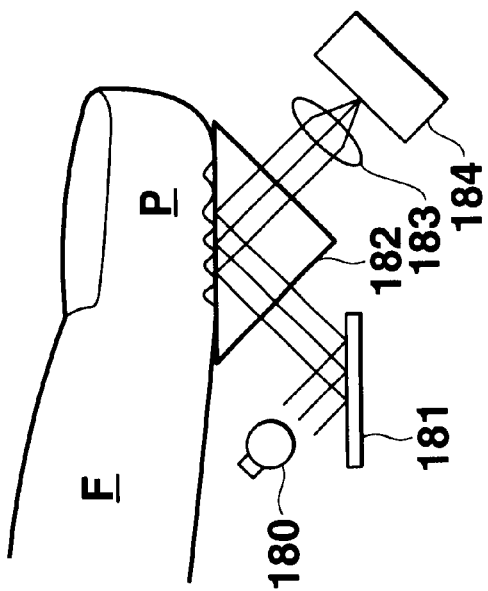
FIG.12B
FIG.12A

FIG.21

| ID (364a) | AUTHENTICATION METHOD (364b) | REGISTRATION DATA (364c) |
|---|---|---|
|  |  |  |
|  |  |  |
|  |  |  |
|  |  |  |

364

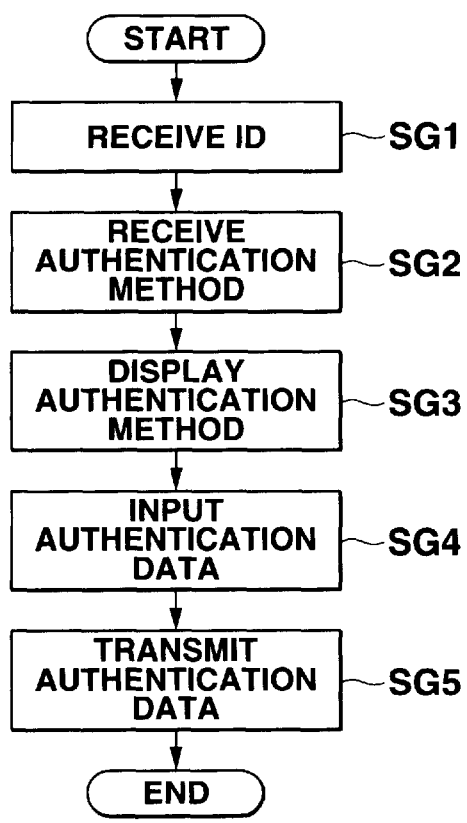

FIG.22A

START → RECEIVE ID (SG1) → RECEIVE AUTHENTICATION METHOD (SG2) → DISPLAY AUTHENTICATION METHOD (SG3) → INPUT AUTHENTICATION DATA (SG4) → TRANSMIT AUTHENTICATION DATA (SG5) → END

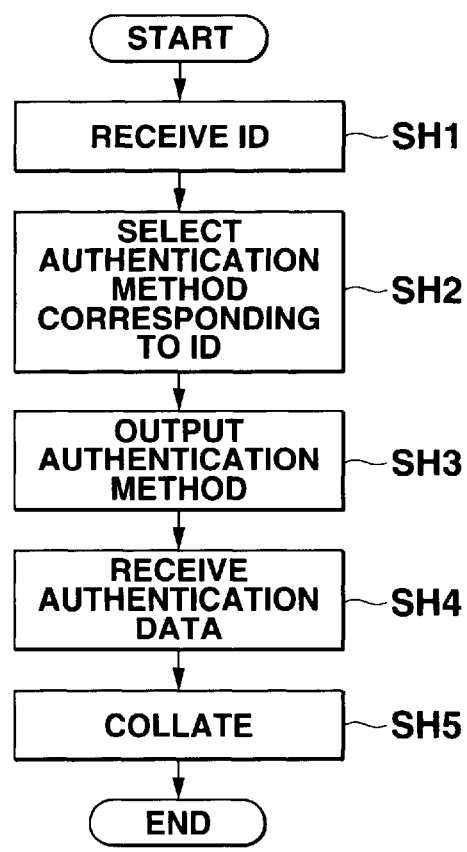

FIG.22B

START → RECEIVE ID (SH1) → SELECT AUTHENTICATION METHOD CORRESPONDING TO ID (SH2) → OUTPUT AUTHENTICATION METHOD (SH3) → RECEIVE AUTHENTICATION DATA (SH4) → COLLATE (SH5) → END

FIG.26A FIG.26B
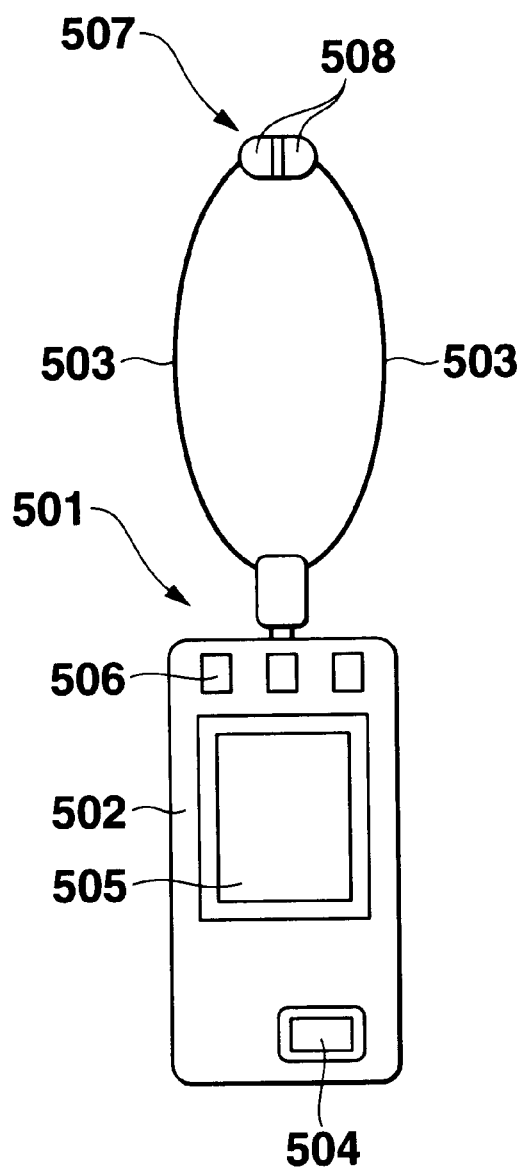
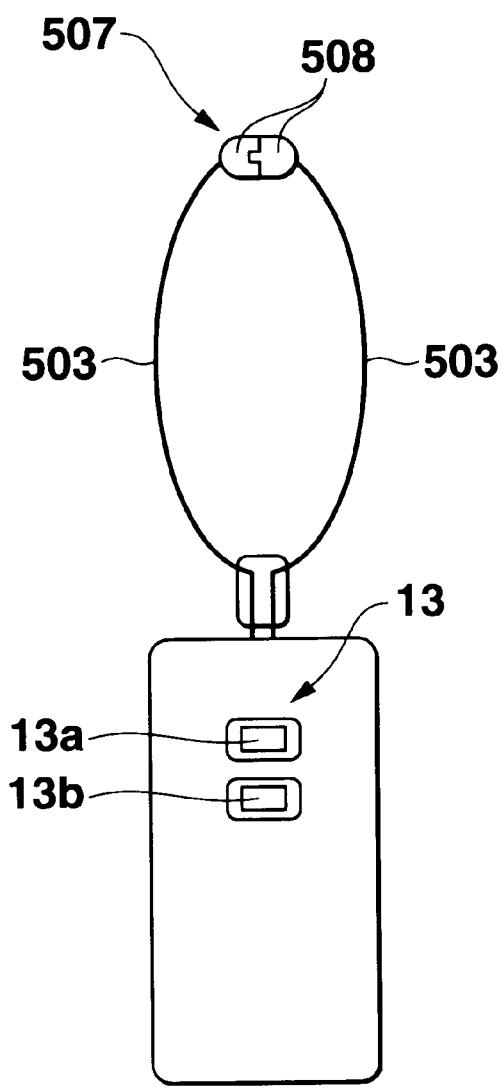

PORTABLE INFORMATION EQUIPMENT, AUTHENTICATION DEVICE, AUTHENTICATION SYSTEM AND AUTHENTICATION METHOD

CROSS-REFERENCE TO RELATED APPLICATIONS

This application is based upon and claims the benefit of priority from the prior Japanese Patent Application No. 11-349764, filed Dec. 9, 1999, the entire contents of which are incorporated herein by reference.

BACKGROUND OF THE INVENTION

The present invention relates to portable information equipment for authenticating a person himself, an authentication device and an authentication system.

As systems for authenticating the user, the following are utilized:

(a) Authentication by using an article recording an ID, such as a magnetic card, an IC card or the like;
  (b) Authentication by inputting authentication data, such as a password known to the user only; and
  (c) Authentication based on organic information, such as fingerprint, voiceprint or retina, characteristic of the user.

In a system employing an article on which ID is printed as described in item (a) above, even a proxy of the user can advantageously authenticate the user himself if the proxy carries an article. However, there is fear of burglar and falsification. In a system employing the data known to the user only, if the data is a simple one such as a birthday, it is easily interpreted. If the data is complex one of many figures, the user finds it difficult to memorize the data and easy to forget. Besides, if a third person sees the user input the authentication data, the authentication data may be disadvantageously stolen. In a system employing organic information characteristic of the user, the highest security can be ensured but, on the other hand, a device therefor becomes disadvantageously more complex and expensive.

Moreover, since necessary security level varies according to the importance of data or services, a required authentication method naturally varies.

Nevertheless, if authentication is conducted through the Internet, a special authentication device is required when a password is inputted using equipment other than a keyboard. For that reason, authentication cannot be conducted without a terminal such as a personal computer equipped with a dedicated authentication device, thereby limiting places where such services are available.

It is, therefore, an object of the present invention to provide a portable information equipment capable of easily conducting authentication and sufficiently ensuring security.

It is another object of the present invention to provide portable information equipment capable of easily authenticating a plurality of systems having different authentication methods and sufficiently ensuring security required for data or services, and to allow increasing places where such services are available at low cost.

BRIEF SUMMARY OF THE INVENTION

According to a first aspect of the present invention, portable information equipment comprises device an attachment detection unit configured to detect whether a device is attached to a human body; an authentication data input unit configured to input authentication data while the device is attached to the human body; a storage unit configured to store the authentication data inputted by the authentication data input unit; a transmission unit configured to transmit the authentication data stored by the storage unit; and an authentication data clear unit configured to clear the authentication data stored by the storage unit if the device attachment detection unit detects that the device is detached from the human body.

According to the above constitution, if authentication data is inputted and stored into the portable information equipment in advance, it suffices to transmit the data when necessary. Thus, it is quite convenient. Further, when the portable information equipment is detached from a person's body, the authentication data is cleared, thereby sufficiently ensuring security.

Further, according to a second aspect of the present invention, a portable information equipment comprises a plurality of authentication data input means, a reception unit configured to receive data for designating authentication data of one of the plurality of authentication data input units, and a transmission unit configured to transmit data inputted by the designated one authentication data input unit.

According to a third aspect of the present invention, a plurality of authentication data can be inputted by using one portable information equipment and then transmitted. Hence, authentication data input units are not required for respective collation devices. That is, only a receiver may suffice, thereby making it possible to provide collation devices at low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a block diagram showing the circuit arrangement and system configuration of a portable information equipment in the fifth embodiment according to the present invention;

FIG. 12A is a conceptual view of an optical fingerprint sensor;

FIG. 12B is a conceptual view of an electrostatic capacitance fingerprint sensor;

FIG. 21 is a conceptual view showing the configuration of a table provided in an authentication control section in the portable information equipment in the ninth embodiment;

FIG. 22A is a flow chart showing processing procedures at a portable information equipment side in the ninth embodiment;

FIG. 22B is a flow chart showing processing procedures at a communication connection device side;

FIG. 26A is a front view showing portable information equipment in the twelfth embodiment according to the present invention;

FIG. 26B is a rear view showing the portable information equipment in the twelfth embodiment according to the present invention;

DETAILED DESCRIPTION OF THE INVENTION

First Embodiment

Figure 1:
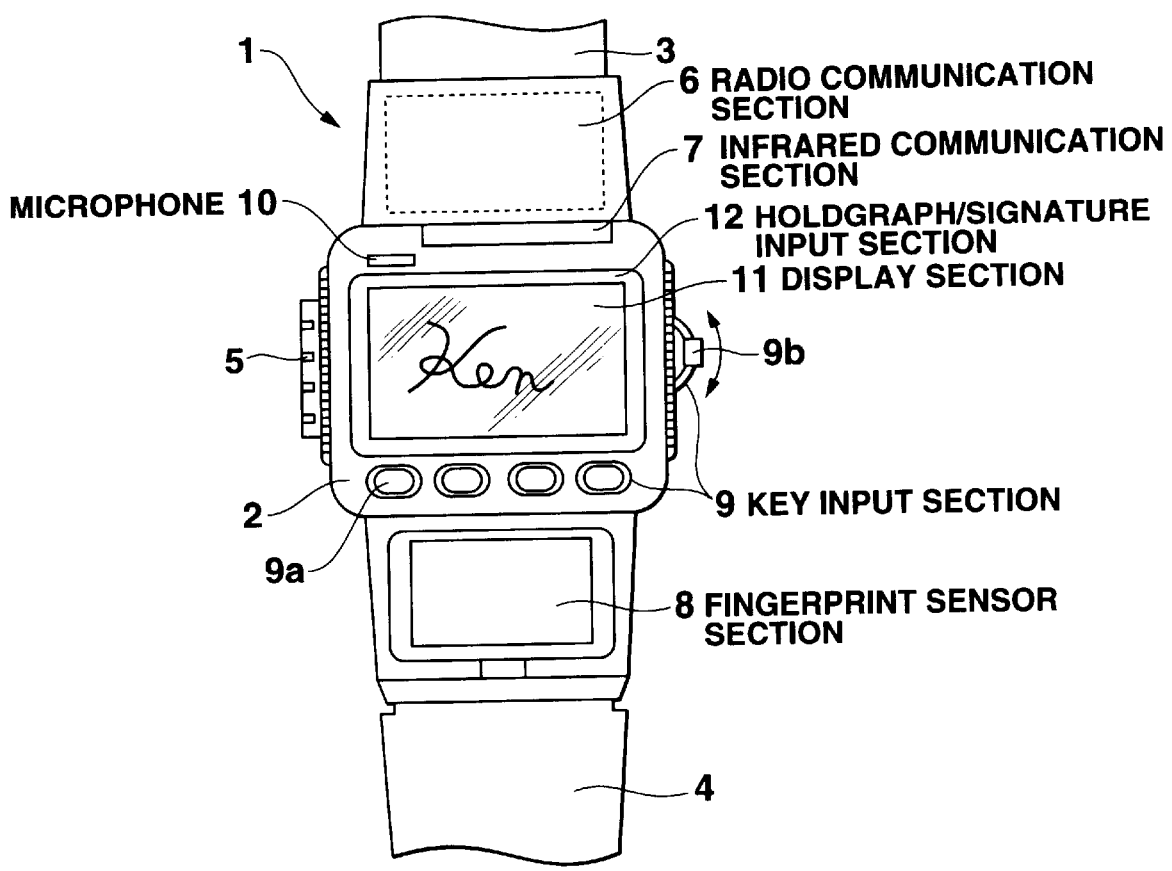
FIG. 1 is a plan view of portable information equipment in the first embodiment according to the present invention.

The first embodiment of the present invention will be described hereinafter with reference to the accompanying drawings. In this embodiment, the present invention is applied to watch-type portable information equipment as shown in FIG. 1. Portable information equipment 1 comprises a watch case 2 and wristbands 3 and 4 coupled to the both end portions of the watch case 2, respectively. A serial input/output terminal 5 is provided on the watch case 2 to protrude at a 9 o'clock side and a radio communication section 6, an infrared Communication section 7 and a microphone 10 are provided on the watch case 2 to protrude at a 12 o'clock side. Also, a fingerprint photographic sensor section B is provided on the watch case 2 to protrude at a 6 o'clock side. A display section 11 comprising an LCD, and a holograph/signature input section 12 are stacked on the front surface of the watch case 2. Between the display section 11 and the fingerprint photographic sensor section 8, a plurality of push keys 9a for inputting data by pushing the keys. A lever key 9b for inputting data by inclining the key 9b toward 12 o'clock and 6 o'clock directions is provided at a 3 o'clock side of the watch case 2. The push keys 9a and the lever key 9b constitute a key input section 9 as a whole.

Figure 2:
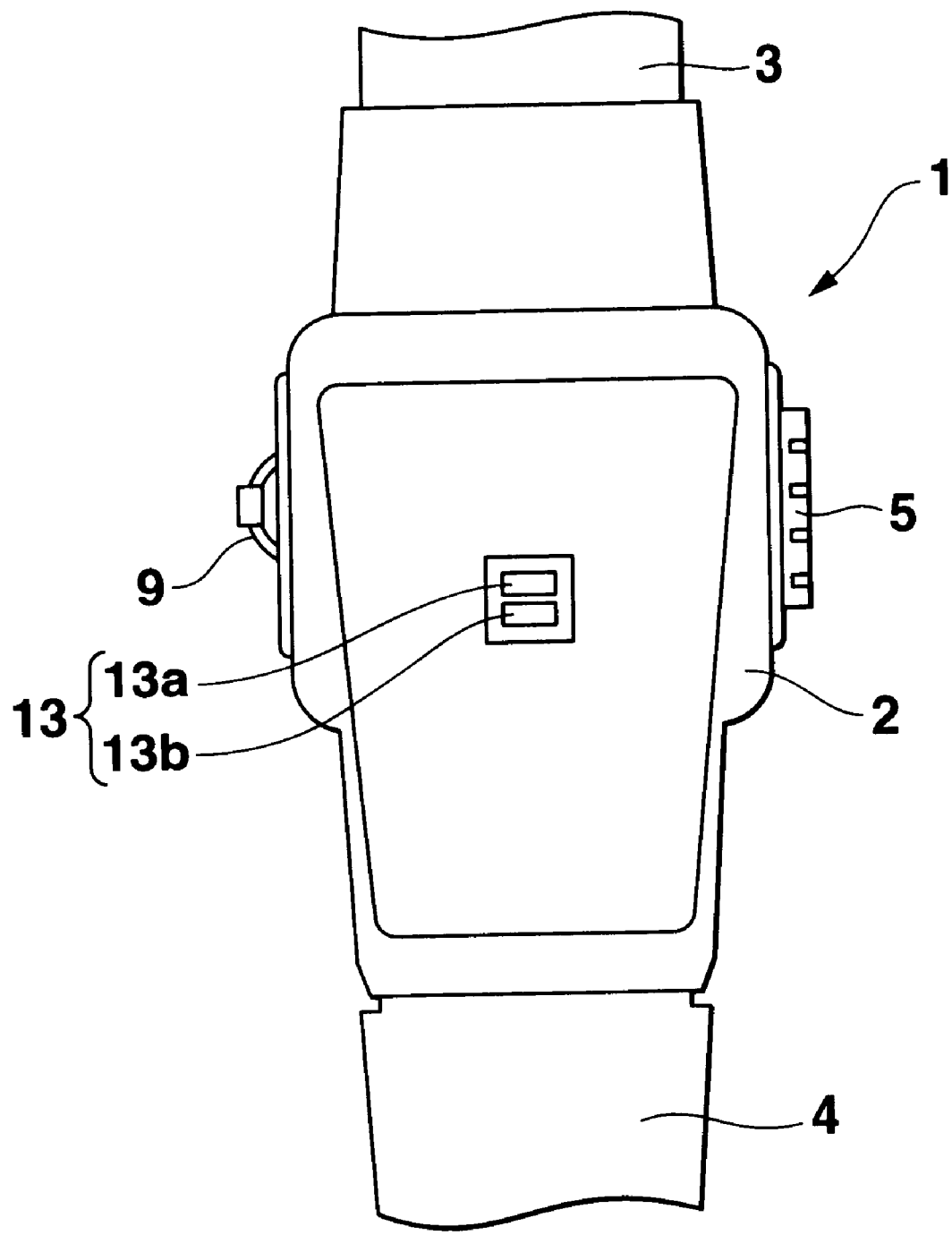
FIG. 2 is a back view of the portable information equipment in the first embodiment.

Further, as shown in FIG. 2, a body attached sensor 13 is provided on the rear surface of the watch case 2. This body attached sensor 13 comprises an infrared LED 13a and an infrared photo-sensor 13b which are arranged to be adjacent each other. By attaching this portable information equipment 1 to the arm (see FIG. 4), an infrared light beam from the infrared LED 13a is reflected on an arm's skin, received by the infrared photo-sensor 13b and thereby turned on.

Figure 3:
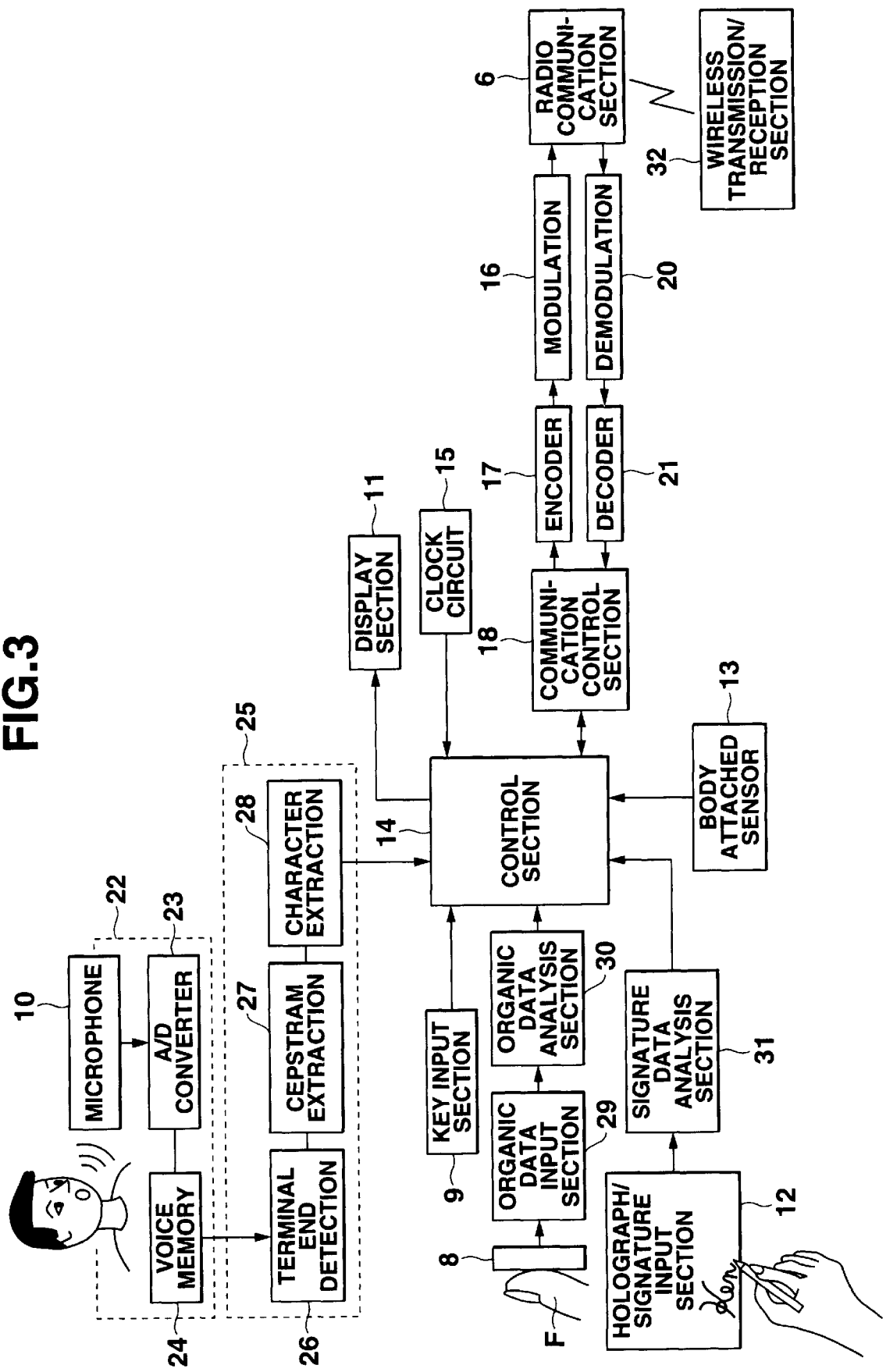
FIG. 3 is a block diagram showing the circuit arrangement of the portable information equipment in the first embodiment.

FIG. 3 is a block diagram showing the circuit arrangement of the portable information equipment 1. As shown therein, this portable information equipment 1 has a control section 14 for controlling the constituent parts of the equipment 1. A clock circuit as well as the key input section 9, the display section 11 and the body attached sensor 13 described above, is connected to the control section 14. This clock circuit 15 divides a clock signal with a predetermined frequency and thereby generates time data. Based on the time data, present time is displayed on the display section 11.

The radio communication section 6 is connected to the control section 14 through a modulation section 16, an encoder 17 and a communication control section 18 in this order. The radio communication section 6 is also connected to the control section 14 through a demodulation section 20, a decoder 21 and the communication control section 18 in this order. Transmission data is, therefore, inputted into the encoder 17 from the control section 14 through the communication control section 18, modulated into a predetermined frequency by the modulation section 16 and transmitted from the radio communication section 6 to an external wireless transmission/reception section 32. Reception data from the wireless transmission/reception section 32 is received by the radio communication section 6, demodulated by the demodulator 20, decoded by the decoder 21 and then inputted into the control section 14 from the communication control section 18.

The microphone 10 is provided in a voice input section 22. This voice input section 22 is provided with an A/D converter 23 for converting a signal from the microphone 10 into a digital signal, and a voice memory 24 storing A/D converted sound data. This voice memory 24 is connected to a terminal end detection section 26 of a voiceprint analysis section 25. The terminal end detection section 26 is connected to a character extraction section 28 through a cepstram extraction section 27. The character of a voiceprint extracted by the character extraction section 28 is inputted into the control section 14.

Further, fingerprint image data outputted from the fingerprint photographic sensor section 8 is inputted into an organic data analysis section 30 through an organic data input section 29. The fingerprint image data analyzed by the organic data analysis section 30 is inputted into the control section 14. Signature data from the holograph/signature input section 12 is analyzed by the signature data analysis section 31 and data indicating the analysis result is inputted into the control section 14.

Figure 4:
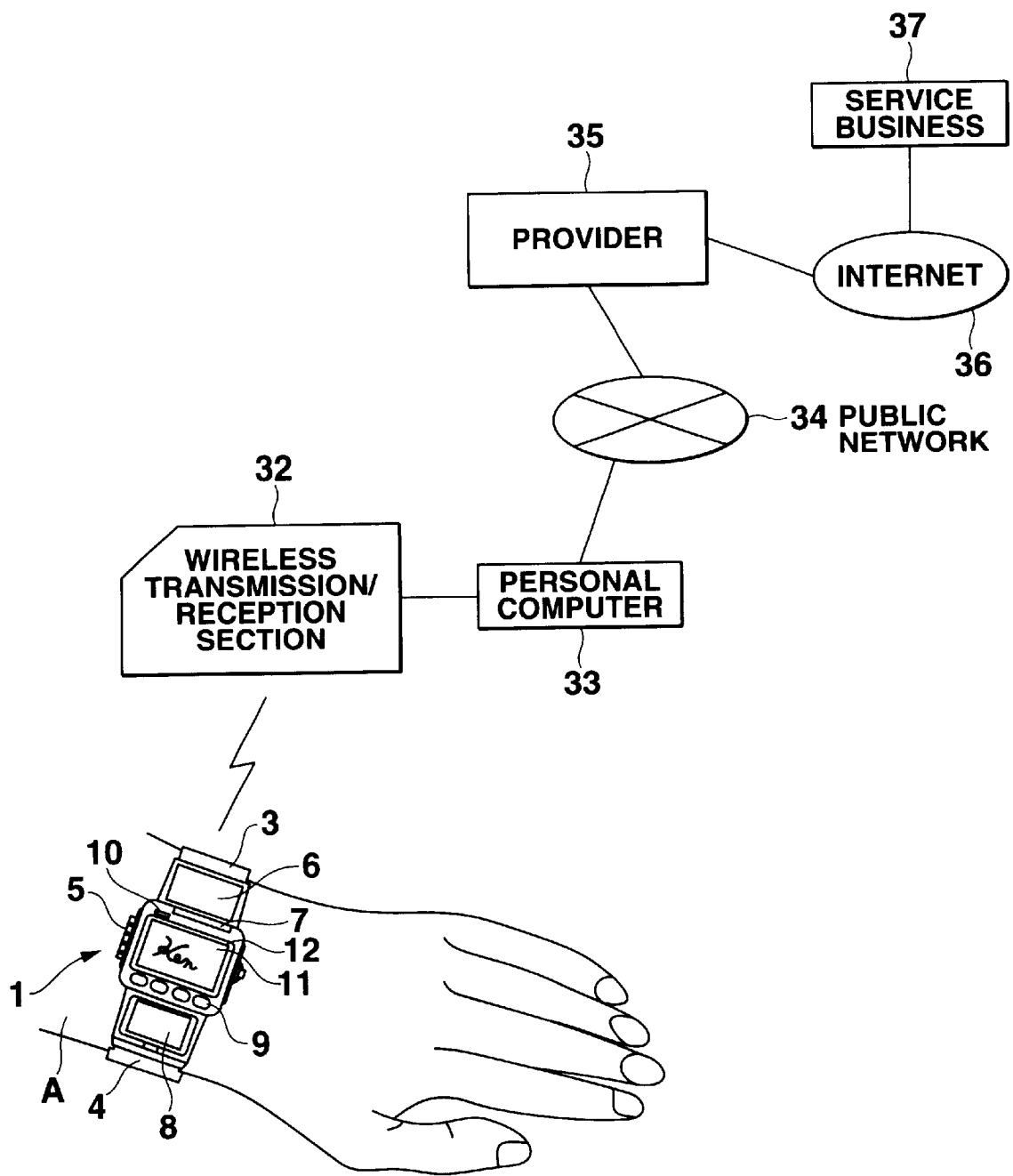
FIG. 4 shows a system configuration in the first embodiment.

FIG. 4 is a system block diagram in this embodiment. As shown therein, the portable information equipment 1 is employed while being attached to a user's arm A with the wristbands 3 and 4. A personal computer 33 is connected to the external wireless transmission/reception section 32 communicating with the radio communication section 6 of the portable information equipment 1. This personal computer 33 is connected to a provider 35 through a public network 34. A service business 37 is connected to the provider 35 through the Internet 36.

Figure 5:
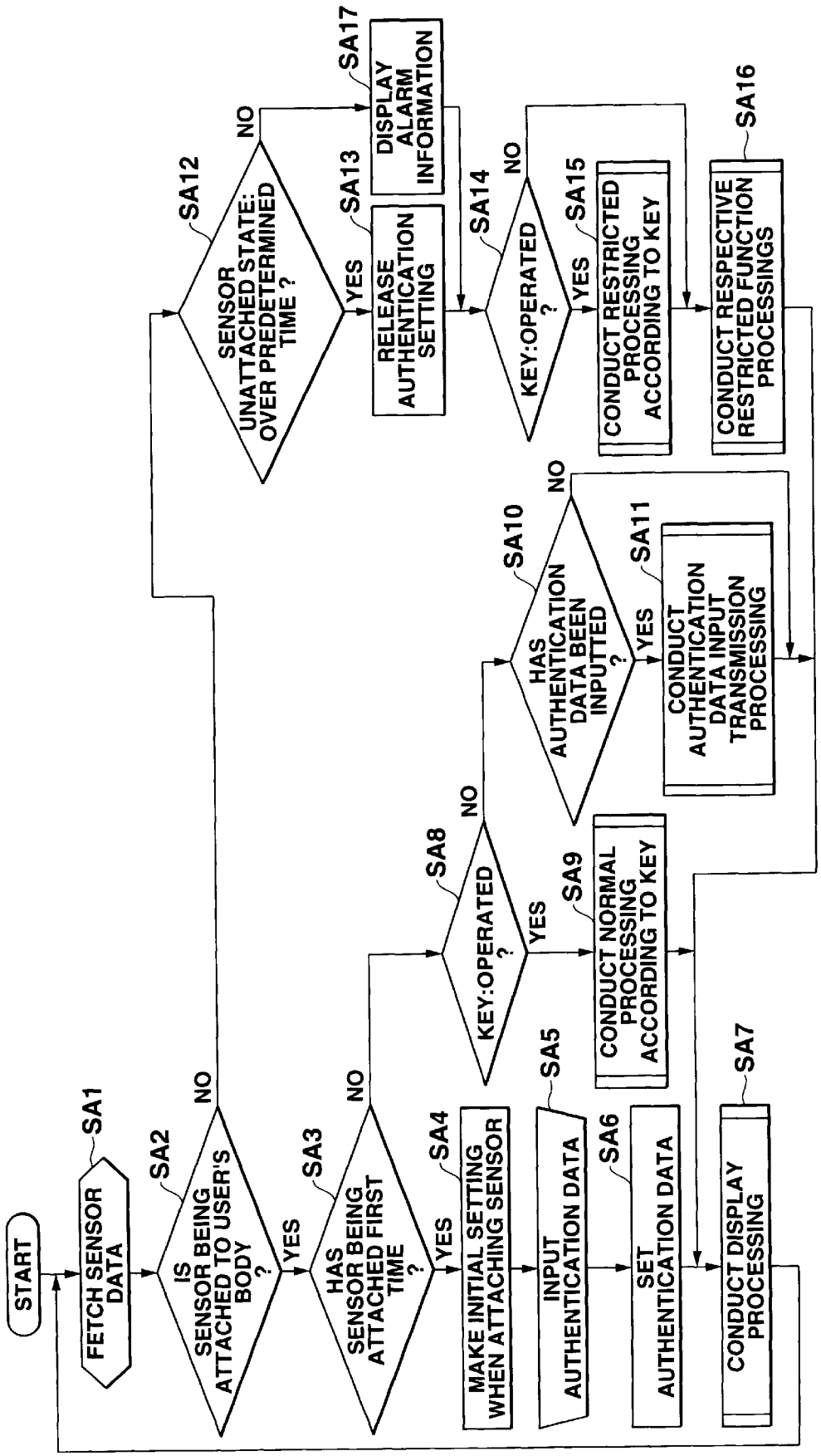
FIG. 5 is a flow chart showing processing procedures conducted at a portable information equipment side in the system configuration shown in FIG. 4.

In the embodiment constituted as stated above, the control section 14 of the portable information equipment 1 operates according to the flow chart shown in FIG. 5 and based on a program stored in the section 14. Namely, sensor data which is output from the body attached sensor 13 is fetched (in a step SA1). It is determined whether this portable information equipment 1 is attached to the arm A which is a user's body (in a step SA2). At this moment, if the body attached sensor 13 is turned on, it is determined that the equipment 1 is attached to the user's body. Further, it is determined whether or not the equipment is attached to the body for the first time, i.e., whether or not the equipment 1 is first attached to the user's body after a non-attachment state passes for a predetermined time as will be described later (in a step SA3).

If the equipment 1 is attached to the body for the first time, then an initial setting for attachment is made (in a step SA4), authentication data is inputted (in a step SA5) and authentication data setting processing is conducted (in a step SA6). As a result of the authentication data setting processing, an ID and a password as the authentication data required when receiving services from the service business 37 are stored in a memory in the control section 14. If the setting of the authentication data is completed, a display processing is conducted (in a step SA7) to thereby allow the authentication data thus set to be displayed on the display section 11.

If the determination result in the step SA3 shows that the processings in the steps SA4 to SA6 stated above have been already conducted instead of attaching the equipment 1 for the first time, it is then determined whether or not the key input section 9 is operated (in a step SA8). If the key input section 9 is operated, a normal processing according to key operation information, i.e., a processing according to key operation information is conducted without giving any restrictions (in a step SA9). At this moment, as shown in the flow charts of FIGS. 6 and 7 which will be described later, an ID and a password are inputted in response to a request from the service business 37. If a transmission key provided at the key input section 9 is operated, an ID and password transmission processing is conducted. Thereafter, the display processing in the step SA7 stated above is executed.

Furthermore, if the determination result in the step SA8 shows that the key input section 9 is not operated, it is determined whether or not authentication data is inputted, i.e., authentication data requested by the service business 37 is inputted (in a step SA10). Then, if the authentication data of fingerprint data, signature data or voiceprint data is inputted in response to the request, an authentication data input transmission processing is conducted (in a step SA11) and the authentication data is transmitted from the radio communication section 6.

If the determination result in the step SA2 shows that the portable information equipment 1 is not being attached to the body, it is determined whether or not a non-attachment state continues over a predetermined time (in a step SA12). If the attachment state continues over the predetermined time, the authentication setting is released and a processing for disabling the authentication request and the like such as deleting the authentication data stored in the memory of the control section 14, is executed (in a step SA13). Accordingly, in the event that this portable information equipment 1 is stolen and the equipment 1 has not been attached to a user's body over a predetermined time, the authentication data is deleted or the like to thereby ensure security. In addition, if the determination result in the step SA12 shows that the equipment 1 has not been attached over the predetermined time, an alarm indicating the non-attachment state is displayed on the display section 11 (in a step SA17). At this time, time for which the non-attachment state is permitted or remaining time until the predetermined time may be displayed on the display section 11.

In a step SA14 following either the step SA13 or the step SA17, it is determined whether or not key operation is conducted. If the key operation is conducted, a processing restricted according to the operated key, e.g., a processing for a clock function excluding the input or output of authentication data or the like is executed (in a step SA15). Furthermore, various restricted functional processings, i.e., processings which do not require the authentication data or not relate to the authentication data, are executed (in a step SA16) and the above-stated step SA7 follows. Accordingly, if this portable information equipment 1 is not attached to the user's body, functions are restricted by the processings of the steps SA15 and SA16. By doing so, even if a person other than the user who does not know that functions are restricted carries the equipment 1, data cannot be transmitted or received by the radio communication section 6, thereby making it possible to ensure security.

On the other hand, the computer at the service business 37 side is connected to the wireless transmission/reception section 32 through the Internet 36, the provider 35, the public network 34 and the personal computer 33. In this state, the service business 37 side computer operates according to a series of flow charts shown in FIGS. 6 and 7. Therefore, the outputs of various pictures in these flow charts are transmitted from the wireless transmission/reception section 32 therethrough. Transmission signals from the wireless transmission/reception section 32 are received by the radio communication section 6 of the portable information equipment 1, whereby various pictures to be described later are displayed on the display section 11.

That is to say, the computer at the service business 37 side first outputs a service menu picture (in a step SB1). As a result, service menus such as "News", "Shopping", "Balance Inquiry", "Music File Download" and others are displayed on the display section 11 of the portable information equipment 1. If the user selects one of these services by the operation of the key input section 9, the code of the selected service is fetched (in a step SB2). Next, it is determined whether or not the service selected by the user is "News" (in a step SB3). If "News" is selected, a password input picture is outputted (in a step SB4). Thus, the password input picture is displayed on the display section 11 of the portable information equipment 1. If an ID and a password are inputted accordingly, the ID and password are fetched (in a step SB5). The password is inputted by operating the transmission key of the portable information equipment 1, and receiving and fetching the ID and password transmitted from the portable information equipment 1.

Furthermore, the password thus fetched is collated with a password registered in advance (in a step SB6) to determine whether these passwords are coincident with each other. If not coincident, an authentication failure picture is outputted (in a step SB10).

If coincident, an authentication success picture is outputted (in a step SB8) and then a news service is started and accounting is executed (in a step SB9). By the processing of the step SB9, character data or the like on the news are transmitted from the wireless transmission/reception section 32 and the news are displayed on the display section 11 of the portable information equipment 1. Additionally, a user-specific accounting value managed by the computer of the service business 37 is counted up.

Namely, if the service selected by the user is "News" and the password is coincident with the registered password, then the selected service can be received.

Furthermore, if the determination result in the step SB3 shows that the user selected service is not "News", it is determined whether or not the service is "Shopping" (in a step SB11). If "Shopping" is selected, a merchandise information picture is outputted (in a step SB12). As a result, information on various merchandise are displayed on the display section 11 of the portable information equipment 1. If purchase some merchandise is inputted according to the picture, it is fetched (in a step SB13) and an ID/credit card number input picture is outputted (in a step SB14). If an ID and a credit card number is inputted according to the picture, the inputted ID and credit card number are fetched (in a step SB15).

Moreover, a fingerprint data input picture is outputted (in a step SB16). If fingerprint data is inputted according to the picture, the data is fetched (in a step SB17). The fingerprint data thus fetched is collated with fingerprint data registered in advance (in a step SB18) to determine whether or not the both data are coincident with each other (in a step SB19). If not coincident, an authentication failure picture is outputted (in a step SB10). If coincident, an authentication success picture is outputted (in a step SB20). Thereafter, electronic settlement is made (in a step SB21).

That is to say, if the service selected by the user is "Shopping", this service cannot be received unless the fingerprint data is coincident with the registered fingerprint data. This is because the payment of money follows the service.

Figure 7:
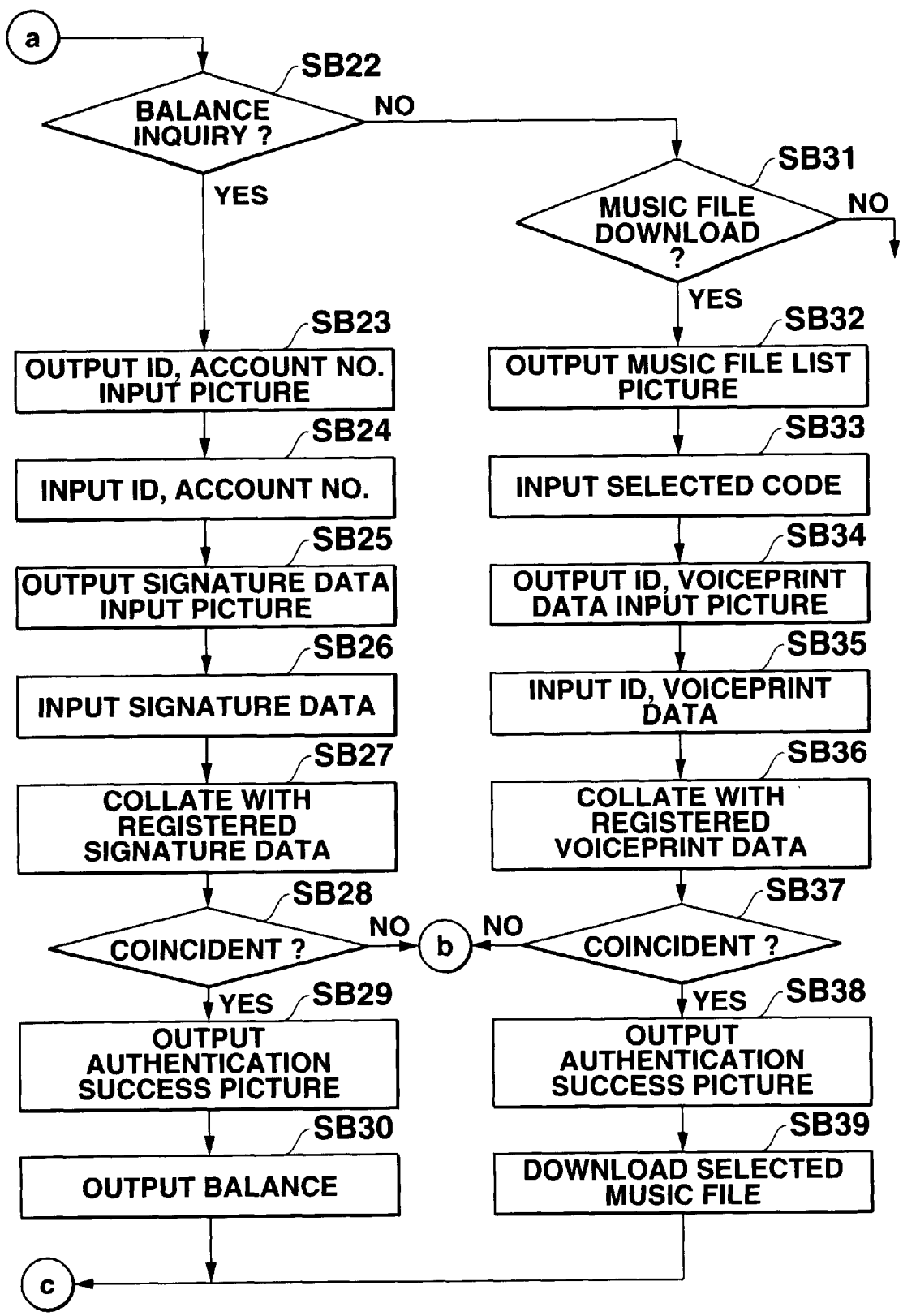
FIG. 7 is a flow chart following the flow chart of FIG. 6.

Furthermore, if the determination result in the step SB11 shows that the user selected service is not "Shopping", it is determined whether or not "Balance Inquiry" is selected (in a step SB22 shown in FIG. 7). In case of the Balance Inquiry, an ID/account number input picture is outputted (in a step SB23). Thus, the ID/account number input picture is displayed on the display section 11 of the portable information equipment 1. If the ID and the account number are inputted according to the picture, the ID and the account number are fetched (in a step SB24).

Next, a signature data input picture is outputted (in a step SB25). Thus, the signature data input picture is displayed on the display section 11 of the portable information equipment 1. If signature data is inputted according to the picture, the data is fetched (in a step SB26). Thereafter, the signature data thus fetched is collated with signature data registered in advance (in a step SB27) to determine whether or not the both data are coincident with each other (in a step SB28). If not coincident, an authentication failure picture is outputted (in a step SB10). If coincident, an authentication success picture is outputted (in a step SB29) and a balance is outputted (in a step SB30). As a result, the user's balance is displayed on the display section 11 of the portable information equipment 1.

Namely, if the user selected service is "Balance Inquiry", it is important personal information and the service cannot be received unless the signature data is coincident with the registered signature data.

If the determination result in the step SB22 shows that the user selected service is not "Balance Inquiry", it is determined whether or not the service is "Music File Download" (in a step SB31). If the service is "Music File Download", a music file list picture is outputted (in a step SB32). As a result, the music file list picture is displayed on the display section 11 of the portable information equipment 1. If the selection code of a certain music file is inputted according to the picture, the code is fetched (in a step SB33) and then an ID/voiceprint input data picture is outputted (in a step SB34). If ID and voiceprint data is inputted accordingly, the data is fetched (in a step SB35).

Thereafter, the voiceprint data thus fetched is collated with the registered voiceprint data (in a step SB36) to determine whether or not the both data are coincident with each other (in a step SB37). If not coincident, an authentication failure picture is outputted (in a step SB29). Thereafter, the music file corresponding to the selection code fetched in the step SB33 is downloaded and outputted (in a step SB39). By doing so, the downloaded music file is transferred to the portable information equipment 1 and stored in the memory in the control section 14.

That is to say, if the user selected service is "Music File Download", the service business 37 provides the service only when the voiceprint data is coincident with the registered voiceprint data. This is because the service business 37 provides data having high degree of service.

If the determination result in the step SB22 shows that the user selected service is not "Music File Download", a processing according to the service selected by the user is executed.

Second Embodiment

Figure 6:
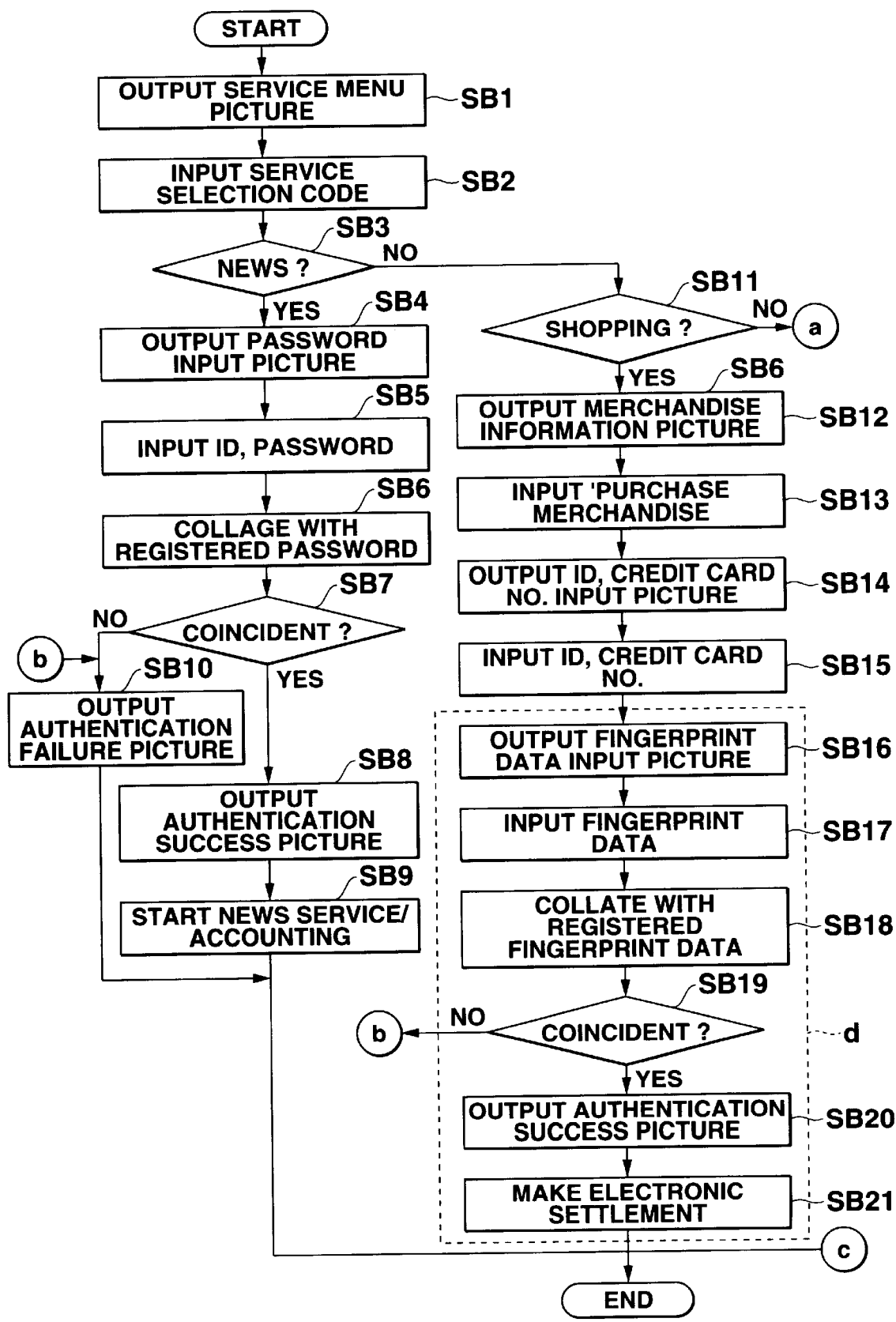
FIG. 6 is a flow chart showing part of the processing procedures of a service provider-side computer in the system configuration shown in FIG. 4.
Figure 8:
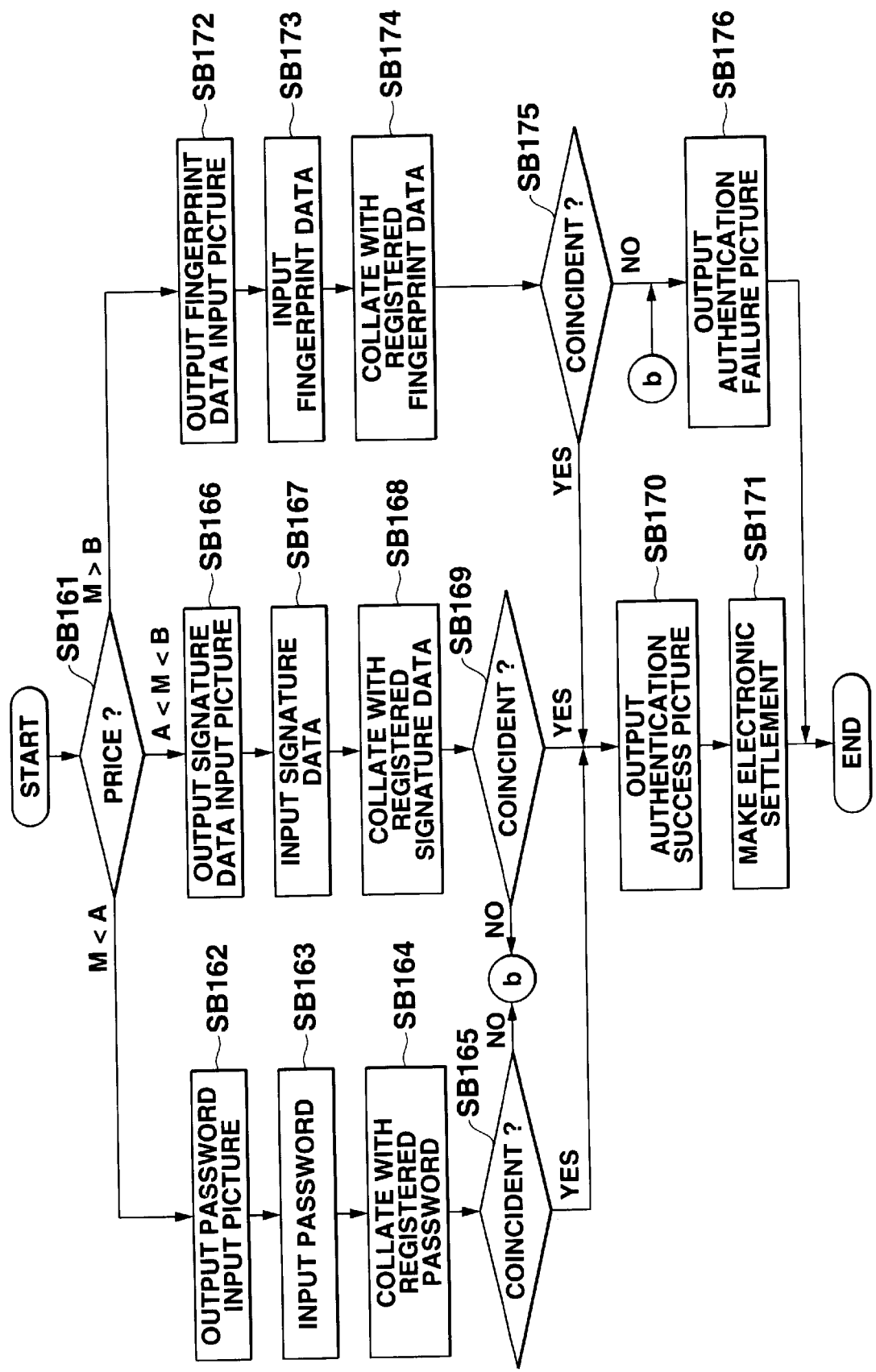
FIG. 8 is a flow chart corresponding to part d shown in FIG. 6 illustrating the second embodiment according to the present invention.

FIG. 8 shows the second embodiment of the present invention and a flow chart corresponding to part d of the flow chart of FIG. 6. Namely, it is determined which relationship the price of a user's purchase which has been fetched in the step SB13 has with respect to standard prices A and B, $M<A$, $A<M<B$ or $M>B$ (in a step SB161). Here, the standard price A is lower than the standard price B, i.e., there is a relationship of $A<B$.

If M<A and the price of the purchase is low, then a password input picture is outputted (in a step S162). If a password is inputted accordingly, the password data is fetched (in a step SB163). Further, the password thus fetched is collated with a password registered in advance (in a step SB164) to determine whether or not the both passwords are coincident with each other (in a step SB165). If not coincident, an authentication failure picture is outputted (in a step SB176). If coincident, an authentication success picture is outputted (in a step SB170) and electronic settlement is made (in a step SB171). Therefore, if the price of the user's purchase is low, the coincidence of passwords is a condition for permitting the purchase of the merchandise.

Moreover, if the determination result in the step SB161 shows that the price M has a relationship of A<M<B and the price of the purchase is slightly high, a signature data input picture is outputted (in a step S166). If signature data is inputted accordingly, the data is fetched (in a step SB167) and the signature data thus fetched is collated with signature data registered in advance (in a step SB168) to determine whether or not the both data are coincident with each other (in a step SB169). If not coincident, an authentication failure picture is outputted (in a step SB176). If coincident, an authentication success picture is outputted (in a step SB170) and electronic settlement is made (in a step SB171). Therefore, if the price of the user's purchase is slightly high, the coincidence of signature data is a condition for permitting the purchase of the merchandise.

If the determination result in the step SB161 shows that the price M has a relationship of M>B and the price of the purchase is high, a fingerprint data input picture is outputted (in a step S172). If fingerprint data is inputted accordingly, the data is fetched (in a step SB173) and the fingerprint data thus fetched is collated with fingerprint data registered in advance (in a step SB174) to determine whether the both data are coincident with each other (in a step SB175). If not coincident, the authentication failure picture is outputted (in a step sB176). If coincident, the authentication success picture is outputted (in a step SB170) and electronic settlement is made (in the step SB171). Therefore, if the price of the user's purchase is high, the coincidence of fingerprint data is a condition for permitting the purchase of the merchandise.

As can be seen, by conducting processings according to this flow, it is possible to attain the reduction of user's operation burden according to the price of a purchase and to ensure the security of the business according to the price of the purchase.

Third Embodiment

Figure 9:
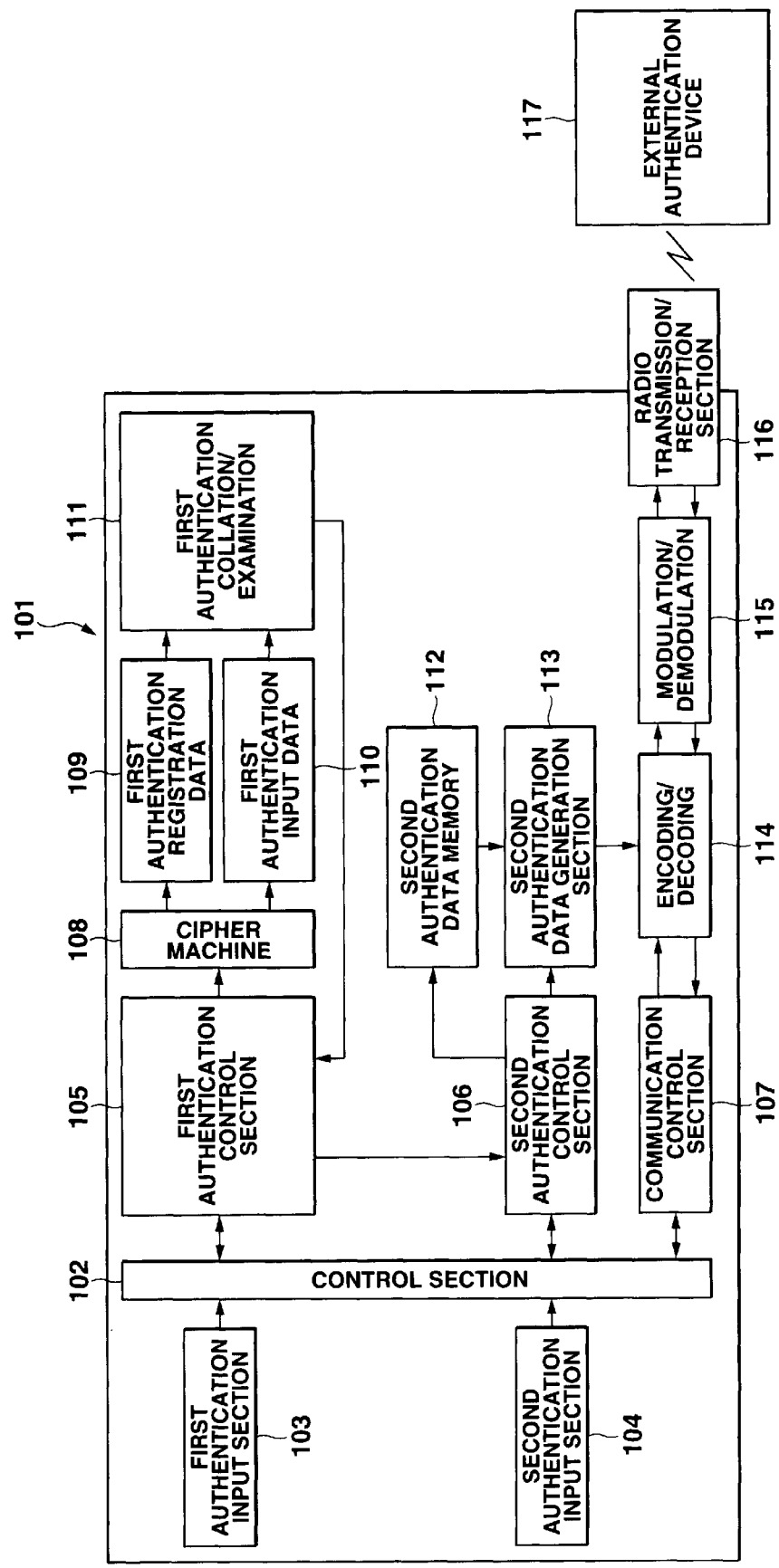
FIG. 9 is a block diagram showing the circuit arrangement of a portable information equipment in the third embodiment according to the present invention.

FIG. 9 shows the third embodiment of the present invention. A portable information equipment 101 in this embodiment has a control circuit 102 controlling the respective constituent parts of the equipment 101. The first authentication input section 103, the second authentication input section 104, the first authentication control section 105, the second authentication control section 106 and a communication control section 107 are connected to the control circuit 102. The first authentication control section 105 is connected to the first authentication collation/examination section block 111 through a cipher machine 108, the first authentication registration data block 109, and the first authentication input data block 110. The first authentication data is registered in the first authentication registration data block 109. An examination result signal from the first authentication collation/examination block 111 is inputted into the first authentication control section 105.

The second authentication control section 106 is connected to the first authentication control section 105 as well as to the second authentication data memory 112 and the second authentication data generation section 113. The second authentication data memory 112 stores therein the second authentication data different from the first authentication data.

The communication control section 107 is connected to a radio transmission/reception section 116 radio-communicating with an external authentication device 117 through an encoding/decoding block 114 and a modulation/demodulation block 115. Also, the second authentication data generated by the second authentication data generation section 113 is inputted into the encoding/decoding block 114.

In this embodiment constituted as stated above, a user inputs the second authentication data from the second authentication input section 194 when using the equipment. Then, the second authentication control section 106 allows the inputted second authentication data to be stored in the second authentication data memory 112.

In this state, if the user inputs the first authentication data from the first authentication input section 103 so as to be authenticated by the external authentication device 117, the data is inputted into the first authentication collation/examination block 111 through the control circuit 102, the first authentication control section 105, the cipher machine 108 and the first authentication input data block 110. At the same time, the first authentication registration data is inputted into the first authentication collation/examination block 111 from the first authentication registration data block 109. The first authentication collation/examination block 111 collates the first authentication input data from the first authentication input data block 110 with the first authentication registered data from the first authentication registration data block 109. If the both data are coincident with each other, a signal is outputted to the first authentication control section 105.

Thereafter, in response to the signal, the first authentication control section 105 outputs a signal to the second authentication control section 106. The second authentication control section 106 supplies the second authentication data stored in the second authentication data memory 112 or the second authentication data generated by the second authentication data generation section 113 to the encoding/decoding block 114. The encoding/decoding block 114 encodes the second authentication data thus supplied. The modulation/demodulation block 115 modulates the second authentication data thus encoded. The radio transmission/reception section 116 transmits the modulated data to the external authentication device 117.

Namely, in this embodiment, the portable information equipment 101 conducts the authentication and collation of the first authentication data. Only if authenticated based on the first authentication data is conducted, the second authentication data is transmitted to the external authentication device 117. The device 117 then conducts authentication based on the second authentication data. Accordingly, even if only the first authentication data is stolen or duplicated, a third person other than the user cannot illegally utilize the service unless the second authentication data is duplicated, thereby making it possible to ensure security.

Fourth Embodiment

Figure 10:
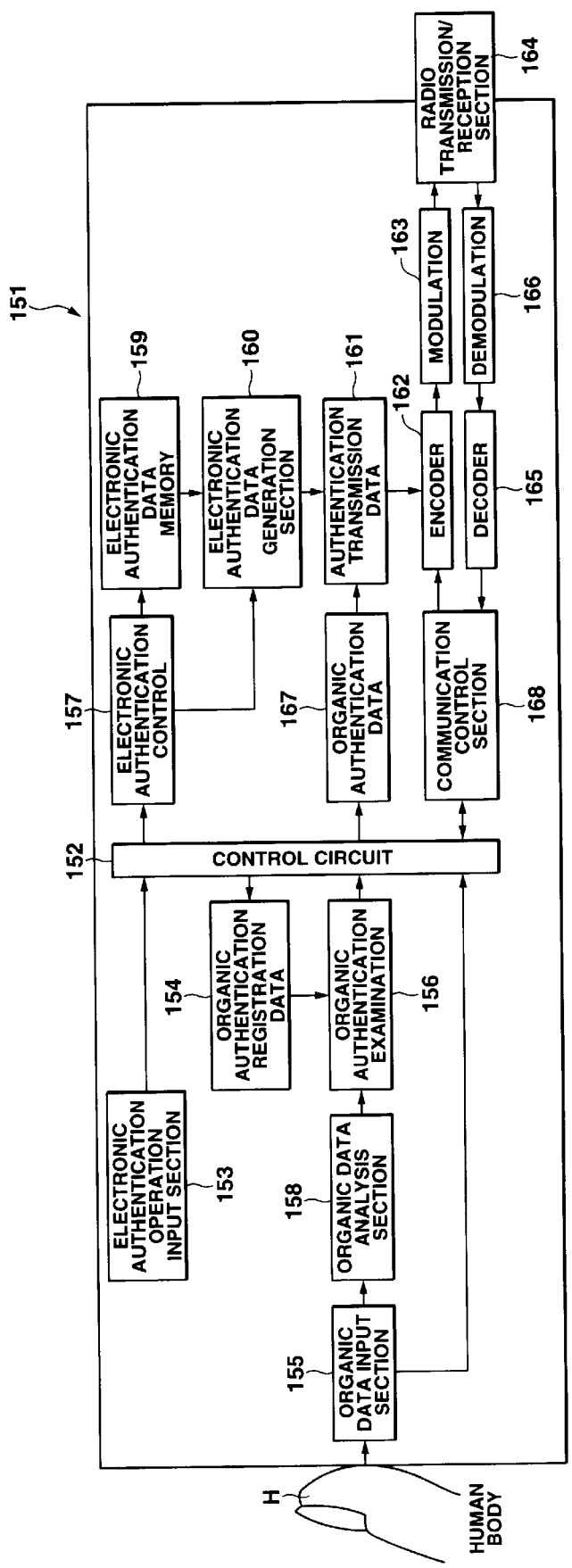
FIG. 10 is a block diagram showing the circuit arrangement of a portable information equipment in the fourth embodiment according to the present invention.

FIG. 10 shows the fourth embodiment of the present invention. A portable information equipment 151 in this embodiment has a control circuit 152 controlling the respective constituent parts of the equipment 151. An electronic authentication operation input section 154, an organic authentication registration data block 154, an organic data input section 155, an organic authentication examination block 156, an electronic authentication control block 157, an organic authentication data block 158 and a communication control section 159 are connected to the control circuit 152. The organic authentication registration block 154 registers therein organic authentication registration data, e.g., fingerprint data, on the user of this portable information equipment 151. The organic authentication registration data is inputted into the organic authentication examination block 156 if necessary. The organic data input section 155 acquires organic data on a human H, e.g., fingerprint data. This organic data is inputted into the organic authentication examination block 156 through an organic data analysis section 158.

On the other hand, an electronic authentication data memory 159 and an electronic authentication data generation section 160 are connected to the electronic authentication control block 157. The electronic authentication data memory 159 stores therein electronic authentication data such as ID's and passwords. Also, an authentication transmission data block 161 is connected to the organic authentication data block 167. The authentication transmission data block 161 supplies the electronic authentication data stored in the electronic authentication data memory 159 or that generated by the electronic authentication data generation section 160, as authentication transmission data, to an encoder 162. A communication control section 168 is connected to a radio transmission/reception section 164 through the encoder 162 and a modulation block 163, and also connected thereto through a decoder 165 and a demodulation block 166.

In this embodiment constituted as stated above, a user inputs electronic authentication data from the electronic authentication operation input section 153 when starting to use the equipment. Then, the electronic authentication control block 157 allows the inputted electronic authentication data to be stored in the electronic authentication data memory 159. Further, the organic authentication registration data is inputted from the organic data input section 155. The control circuit 152 then registers the data in the organic authentication registration data block 154.

In this state, if the user inputs organic data from the organic data input section 155 so as to be authenticated, the data is inputted into the organic authentication examination block 156 through the organic data analysis section 158. The organic authentication examination block 156 compares the inputted organic data with the organic authentication registration data registered in the organic authentication registration data block 154. Then, the electronic authentication control block 157 is actuated by the control of the control circuit 152, thereby outputting the electronic authentication data stored in the electronic authentication data memory 159 or that generated in the electronic authentication data generation section 160 to the authentication transmission data block 161. The authentication transmission data block 161 supplies the electronic authentication data, as authentication transmission data, to the encoder 162. The encoder 162 encodes the supplied electronic authentication data. The modulation block 163 modulates the encoded data. The radio transmission/reception section 164 transmits the modulated data to an external authentication device.

That is, in this embodiment, the portable information equipment 151 conducts authentication based on organic data only if authentication is conducted based on the organic data, the electronic authentication data is transmitted to the external authentication device, which device conducts authentication based on the electronic authentication data. Accordingly, even if electronic authentication data such as an ID and a password, is stolen or duplicated, a third person cannot illegally utilize the service, thereby making it possible to ensure security.

Fifth Embodiment

FIG. 11 shows the fifth embodiment of the present invention. A system in this embodiment consists of a portable information equipment 171 and an authentication device 191. The portable information equipment 171 has a control section 172 controlling the respective constituent parts of the equipment 171. A fingerprint data authentication examination block 173, other authentication data block 174 for data such as ID's and PIN's (personal identification number), a body attached sensor and the like 175 and a radio transmission/reception section 179 are connected to the control section 172. A fingerprint sensor 176 is connected to the fingerprint data authentication examination block 173 through a fingerprint character data analysis block 177, and a registered fingerprint data block 178 is also connected to the block 173.

The authentication device 191 has a control section 213 controlling the respective constituent parts of the device 191. A radio transmission/reception section 193 communicating with the radio transmission/reception section 179 of the portable information equipment 171 and an authentication data decoding block 194 are connected to the control section 213. The authentication data decoding block 194 is connected to an access control & service control block 196 through an authentication examination block 195. A control signal from the access control & service control block 196 is fed to a system OR server 197.

As the fingerprint sensor 176, an optical fingerprint sensor shown in FIG. 12A or an electrostatic capacitance finger print sensor shown in FIG. 12B is employed. The optical fingerprint sensor comprises a light source 180, a reflection plate 181, a prism 182, a lens 183 and an image pickup device 184 such as a CCD or a CMOS sensor. A light beam from the light source 108 is reflected on the fingerprint P of a finger F by the reflection plate 181 and the prism 182, and an image of the reflected light is formed on the image pickup device 184 by the prism 182 and the lens 183 to thereby pickup the image.

Further, the electrostatic capacitance fingerprint sensor comprises a contact plate 185 made of, for example, $SiO_2$, a plurality of minute electrodes 186 arranged on the rear surface of the contact plate 185 at appropriate intervals and a circuit section 187 connected to the respective minute electrodes 186. When a fingerprint P is brought into contact with the contact plate 185, the ridge (convex portion) P1 of the fingerprint P contacts with the contact plate 185 but the trough P2 (concave portion) of the fingerprint P does not contact with the plate 185. Therefore, the electronic capacitances of the respective minute electrodes 186 differ according to the shape (pattern of the ridge P1 and trough P2) of the fingerprint. By obtaining the electrostatic capacitances of the respective minute electrodes 186, the shape of the fingerprint is detected.

In this embodiment, character data on fingerprint data detected by the fingerprint sensor 176 of either optical or electrostatic capacitance type is analyzed by the fingerprint character data analysis block 177. The fingerprint data authentication examination block 173 compares the fingerprint data with fingerprint data registered in the fingerprint registration fingerprint data block 178 in advance. If the both data are coincident with each other, the data such as the ID and the PIN in the other authentication data block 175 is transmitted to the authentication device 191 through the control section 172 by the radio transmission/reception section 179.

Sixth Embodiment

Figure 13:
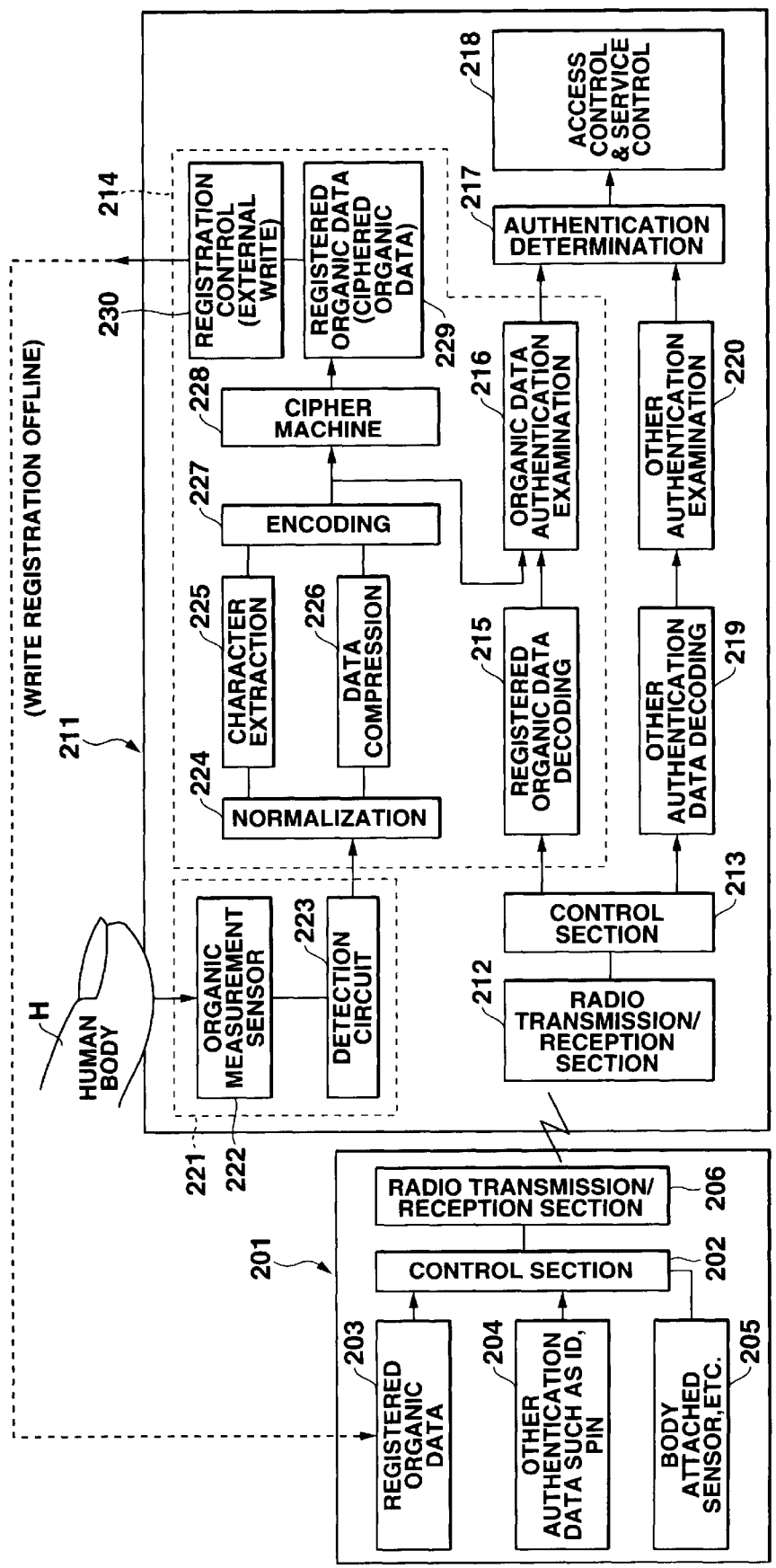
FIG. 13 is a block diagram showing the circuit arrangement of portable information equipment and an authentication device in the sixth embodiment according to the present invention.

FIG. 13 shows the sixth embodiment of the present invention. A system in this embodiment comprises a portable information equipment 201 and an authentication device 211. The portable information equipment 201 comprises a control section 202 controlling the respective constituent parts of the equipment 201, a registered organic data block 203 connected to the control section 202, an other authentication data block 204 for data such as ID's and PIN's, a body attached sensor 205 and a radio transmission/reception section 206.

The authentication device 211 has a control section 213 controlling the respective constituent parts of the device 211. A radio transmission/reception section 212 communicating with the radio transmission/reception section 206 of the portable information equipment 201, a registered organic data decoding block 215 and other authentication block decoding block 219. The registered organic data decoding block 215 is provided in an organic data analysis & authentication section 214 and connected, through an organic data authentication examination block 216 provided in the organic data analysis section & authentication section 214, to an authentication determination block 216. The authentication determination block 217 is connected to an access control & service control block 218. The other authentication data decoding block 219 is connected to the authentication determination block 217 through the other authentication examination block 220.

The authentication device 211 is also provided with an organic sensor 221. The organic sensor 221 comprises an organic measurement sensor 222 and a detection circuit 223 detecting a signal from the organic measurement sensor 222. After a signal from the detection circuit 223 is processed by a normalization block 224, the character of the signal is extracted by a character extraction block 225 and, at the same time, compressed by a data compression block 226. The extracted character data and compressed data are encoded by an encoding block 227 and ciphered by a cipher machine 228. The ciphered organic data is registered in the registered organic data (ciphered organic data) block 229. The ciphered organic data in the registered organic data (ciphered organic data) block 229 can be written offline to the registered organic data block 203 of the portable information equipment 201.

That is to say, in this embodiment, the organic sensor 221 is not provided at the portable information equipment 201 side but at the authentication device 211 side. By doing so, the authentication device 211 detects, ciphers organic data and registers the resultant data in the registered organic data (ciphered organic data) block 229. The registered organic data (ciphered organic data) is written offline to the registered organic data block 203 of the portable information equipment 203, thereby allowing the data to be registered at the portable information equipment 201 side.

As can be seen, an in the case of the preceding fourth embodiment, the portable information equipment 201 conducts authentication based on organic data. Only when authentication is conducted based on the organic data, other authentication data such as an ID and a PIN are transmitted to an external authentication device 211, which device 211 can conduct authentication based on these authentication data. Since it is not necessary to provide the organic sensor 221 at the portable information equipment 201 side, it is possible to ensure security while making the portable information equipment 201 smaller in size.

Seventh Embodiment

Figure 14:
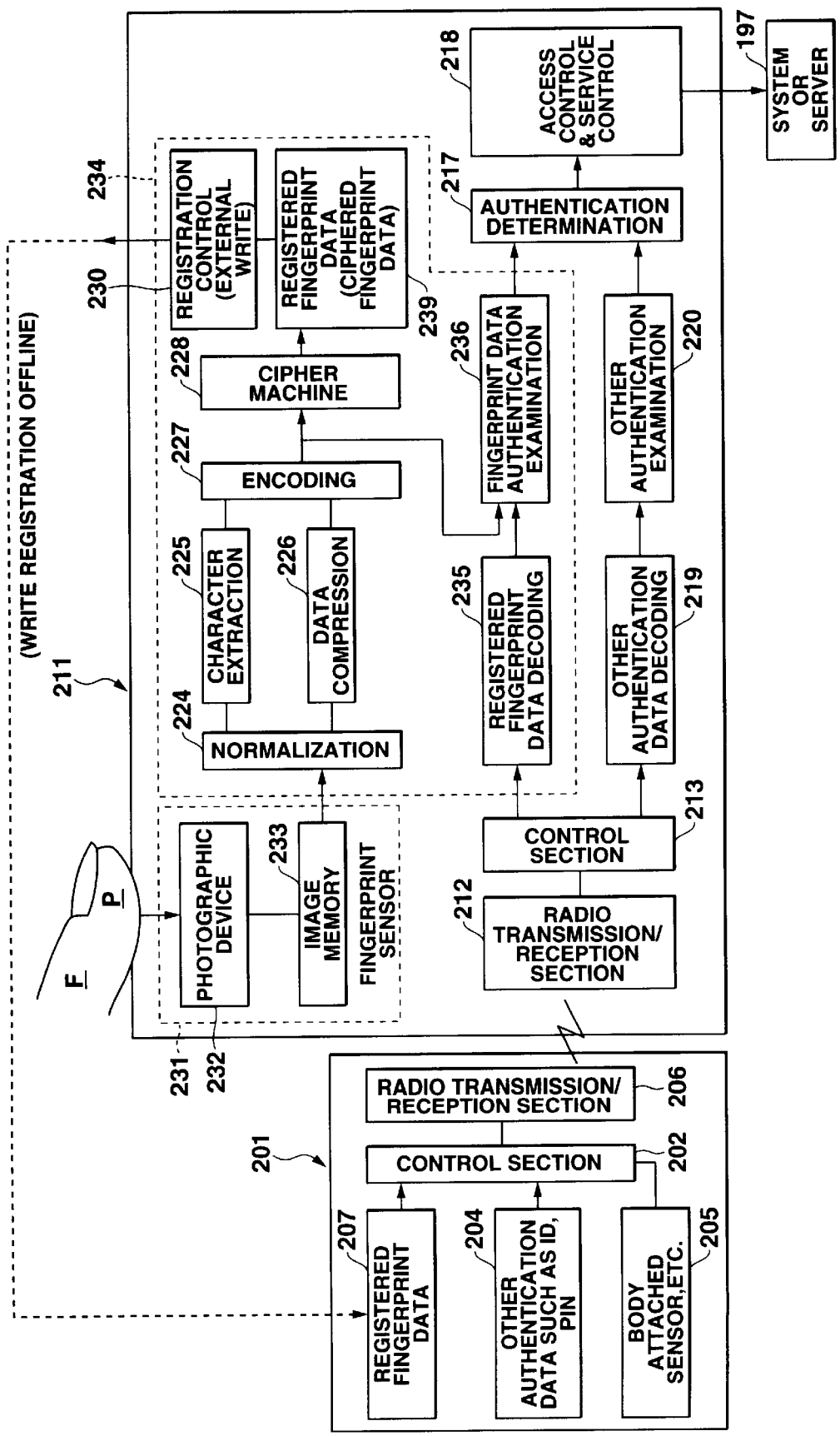
FIG. 14 is a block diagram showing the circuit arrangement of portable information equipment and an authentication device in the seventh embodiment according to the present invention.

FIG. 14 shows the seventh embodiment of the present invention. Portable information equipment 201 in a system in this embodiment is provided with a registered fingerprint data block 207 instead of the registered organic data block 203 in case of the sixth embodiment shown in FIG. 13. An authentication device 211 is provided with a fingerprint sensor 231 instead of the organic sensor 211 and with a fingerprint analysis section & authentication section 234 instead of the organic analysis section & authentication & section 214. Further, the fingerprint analysis section authentication section 234 is provided with a registered fingerprint data decoding block 235 and a fingerprint data authentication examination block 236 instead of the registered organic data decoding block 215 and the organic data authentication examination block 216, and with a registered fingerprint data (ciphered fingerprint data) block 239 instead of the registered organic data (ciphered organic data) block 229. The remaining constituent parts are the same as those in the sixth embodiment.

The fingerprint sensor 231 comprises an image pickup device 232 which picks up an image of the fingerprint P of a finger F and outputs image data, and an image memory 233 which stores the image data from the image pickup device 232. The registered fingerprint data (ciphered fingerprint data) block 239 stores the fingerprint data encoded by an encoding block 227 and ciphered by a cipher machine 228. A system OR server 197 is connected to an access control & service control block 128.

In this embodiment, the fingerprint sensor 231 is not provided at a portable information equipment 201 side but at an authentication device 211 side. The authentication device 211 detects and ciphers fingerprint data and registers the resultant data in the registered fingerprint data (ciphered fingerprint data) block 239. The registered fingerprint data (ciphered fingerprint data) is written offline to the registered fingerprint data block 207 of the portable information equipment 201, thereby allowing the data to be also registered at the portable information equipment 201 side. Accordingly, it is not necessary to provide the fingerprint sensor 231 in the portable information equipment 201, thereby making it possible to ensure security while making the portable information equipment 201 smaller in size.

Eighth Embodiment

Figure 15:
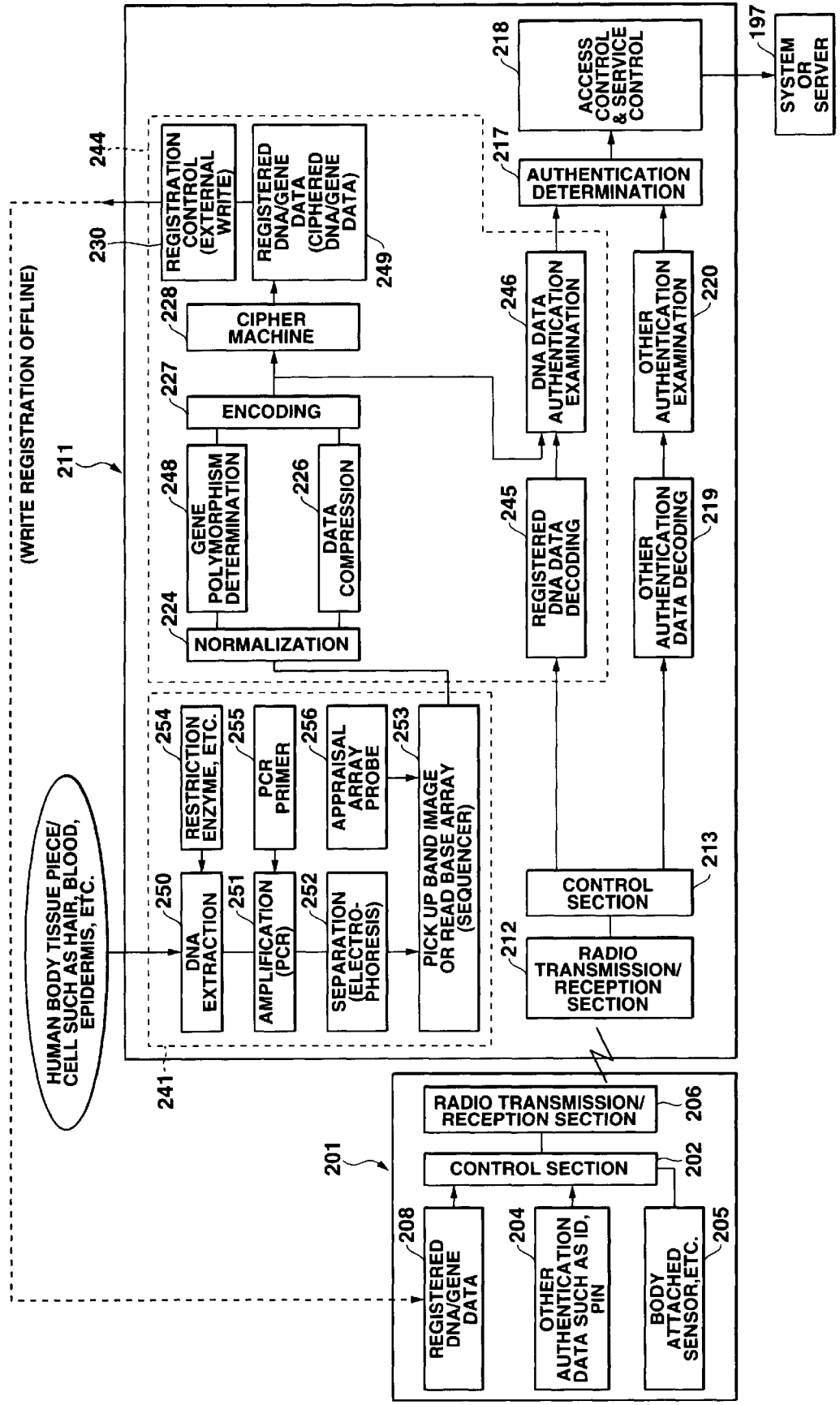
FIG. 15 is a block diagram showing the circuit arrangement of portable information equipment and an authentication device in the eighth embodiment according to the present invention.

FIG. 15 shows the eighth embodiment of the present invention. A portable information equipment 201 in a system in this embodiment is provided with a registered DNA/gene data block 208 instead of the registered organic data block 203 in case of the sixth embodiment shown in FIG. 6. Further, an authentication device 211 is provided with an DNA polymorphism/array detection section 241 instead of the organic sensor 221, and with a DNA/gene analysis & authentication section 244 instead of the data analysis section & authentication section 214. The DNA/gene analysis & authentication section 244 is provided with a gene polymorphism determination block 248 instead of the character extraction block 225, with a registered DNA data decoding block 245 and a DNA data authentication examination block 246 instead of the registered organic data decoding block 215 and the organic data authentication examination block 215, and with a registered DNA/gene data (ciphered DNA/gene data) block 249 instead of the registered organic data (ciphered organic data) block 229. The remaining constituent parts are the same as those in the sixth embodiment.

The DNA polymorphism/array detection section 241 is provided with a DNA extraction block 250 extracting DNA from tissue pieces/cells of a human body such as hair, blood or epidermis, by using a restriction enzyme 254, an amplification (PCR) block 251 amplifying the DNA by a PCR primer 255, and a separation (electrophoresis) block 252 separating the DNA. The section 241 is also provided with a band photographic or base array read (sequencer) block 253 treating the separated DNA based on an appraisal array block 256.

Figure 16:
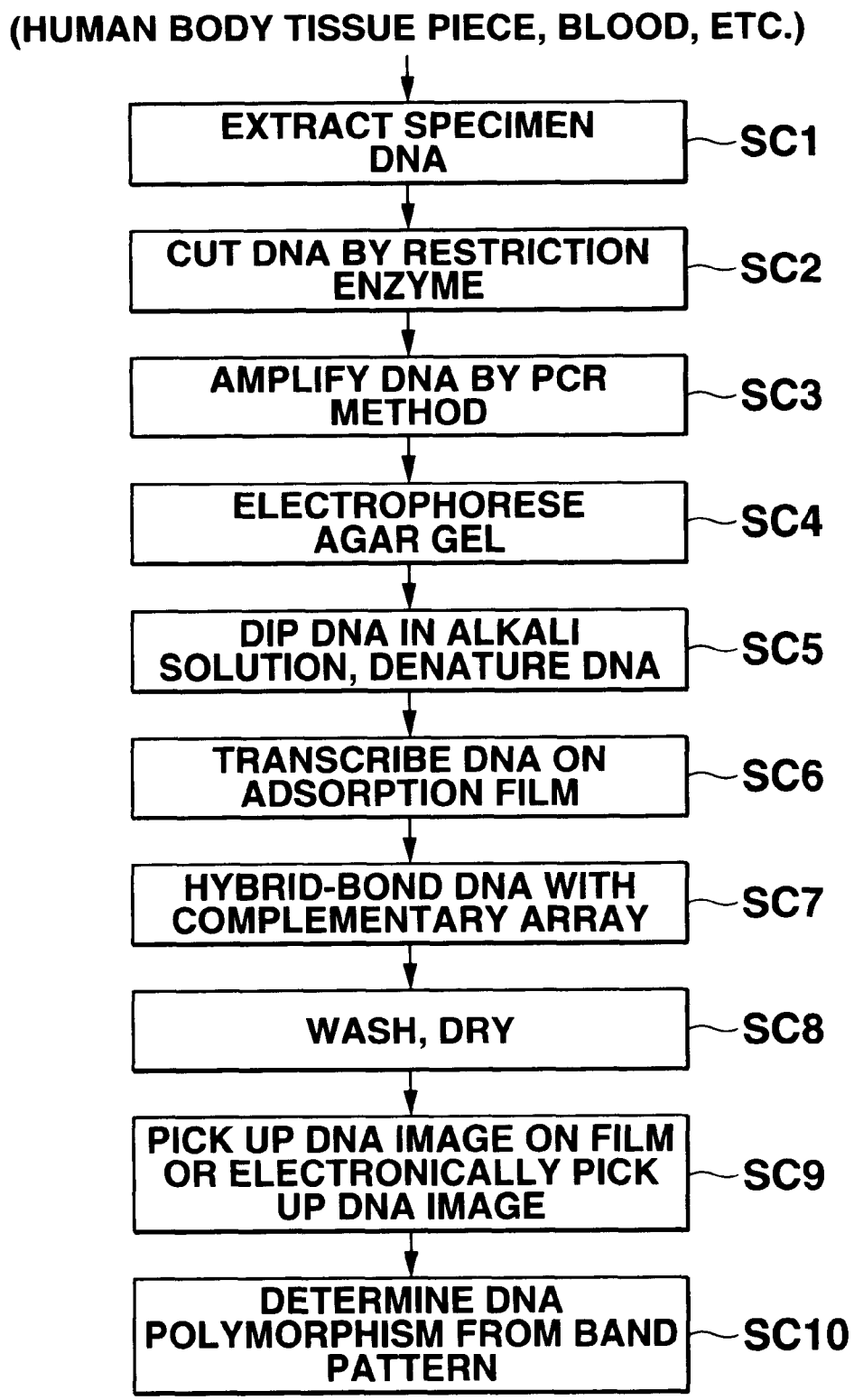
FIG. 16 is a flow chart showing procedures for determining a DNA polymorphism.

In this embodiment constituted as stated above, the DNA polymorphism/array detection section 241 determines a DNA polymorphism according to a flow shown in FIG. 16. Namely, a specimen DNA is extracted from the tissue piece of a human body or blood (in a step SC1), cut by a restriction enzyme (in a step SC2), and then amplified by a PCR method using the PCR primer (in a step SC3). Following this, agar gel is electrophoresed (in a step SC4), dipped in alkali base to denature the DNA (in a step SC5), and the DNA is transcribed onto an adsorption film (in a step SC6). Further, after hybrid-bonding the DNA with a complementary array (in a step SC7), the resultant DNA is washed and dried (in a step SC8), an image thereof is picked up on a film or electronically picked up (in a step SC9). Thereafter, the gene polymorphism determination block 248 determines a DNA polymorphism from the band pattern of the image (in a step SC10).

Figure 17:
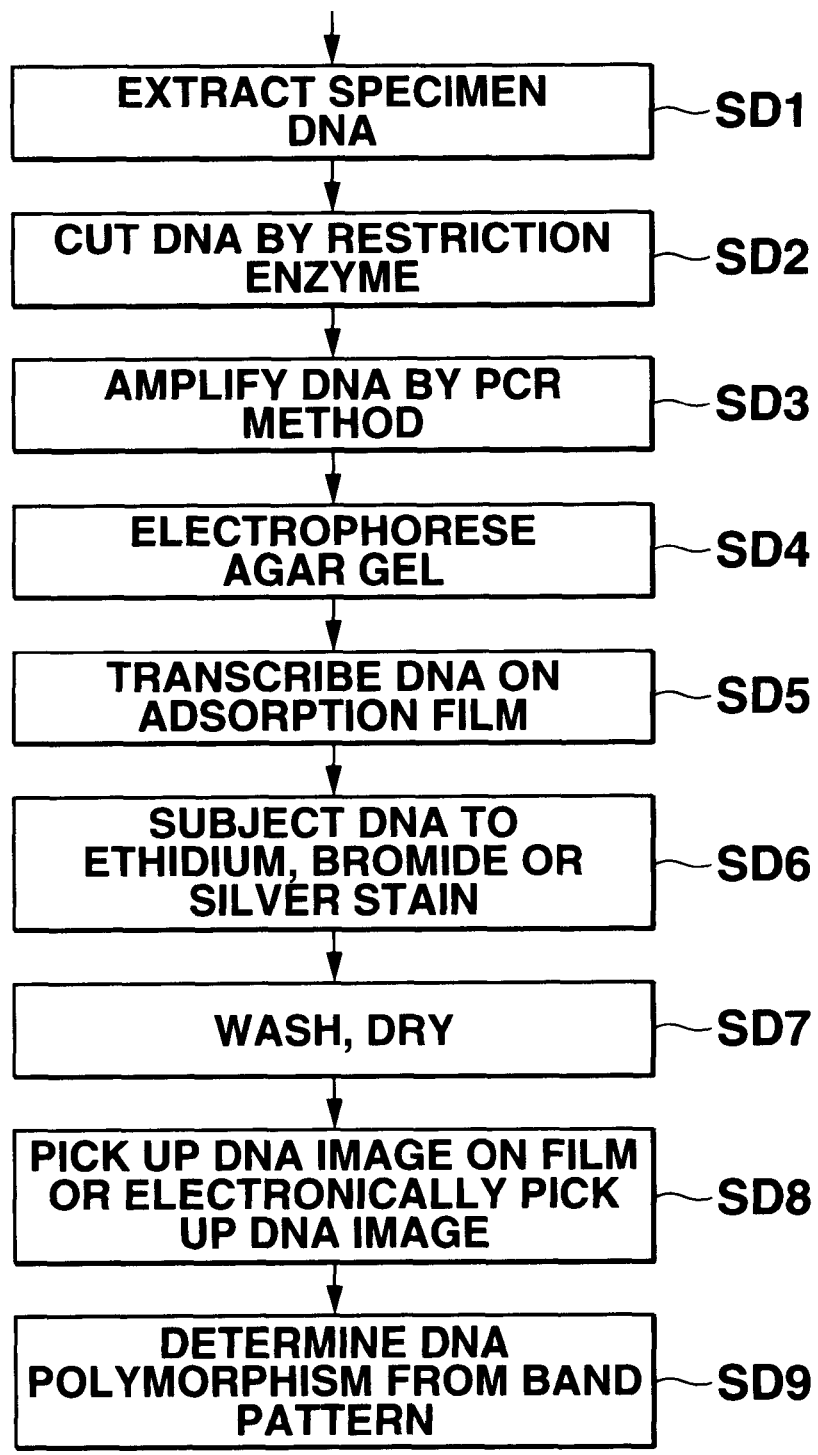
FIG. 17 is a flow chart showing another procedures for determining a DNA polymorphism.

Alternatively, DNA polymorphism may be determined according to a flow shown in FIG. 17. Namely, in this flow, steps SD1 to SD4 are the same as the steps SC1 to SC4 shown in FIG. 16. Following these steps, the DNA is transcribed on an adsorption film (in a step SD5), and subjected to ethidium, bromide or silver stain (in a step SD6). Further, as in the case of the steps SC8 to SC10 stated above, the resultant DNA is washed and dried, an image thereof is picked up on a film or electronically picked up, thereby determining a DNA polymorphism from the band pattern of the image (in steps SD7 to SD9).

In this way, the DNA polymorphism determined by the gene polymorphism determination block 248 is encoded by the encoding block 227, ciphered by the cipher machine 228 and registered by the registered DNA/gene data (ciphered DNA/gene data) block. Thereafter, the DNA polymorphism is written offline from a registration control (external write) block 230 to the registered DNA/gene data block 207 of the portable information equipment 201.

When utilizing an authentication service, the registered DNA/gene data is read from the registered DNA/gene data block 208 of the portable information equipment 201 and transmitted from the radio transmission/reception section 206 to the authentication device 211. Other authentication data, such as an ID and a PIN, in the other authentication data block 204 are simultaneously transmitted to the authentication device 211.

The radio transmission/reception section 212 of the authentication device 211 receives the data and transmits the registered DNA data thus received to the DNA data authentication examination block 246 through the control section 213 and the registered DNA data decoding block 245. Further, in the authentication device 211, a DNA polymorphism is determined again according to the procedures shown in FIG. 16 or 17 from the tissue piece of the human body, blood or the like. The re-determined DNA data is fed to the DNA data authentication examination block 246. The DNA data authentication examination block 246 compares the registered DNA data received with the DNA data this time. If the both data are coincident with each other, the block 246 outputs a signal to the authentication determination block 217.

On the other hand, the other authentication data received in the radio transmission/reception section 212 is inputted into the other authentication examination block 220 through the control section 213 and the other authentication data decoding block 219. The other authentication examination block 220 then compares the other authentication data received with the other authentication data registered in advance. If the both data are coincident with each other, the block 220 outputs a signal to the authentication determination block 217.

The authentication determination block 217 feeds a signal indicating that the user is authenticated to the access control & service control block 218 and the user is permitted to use the authentication service if signals are outputted from both the DNA data authentication examination block 246 and the other authentication examination block 220, i.e., if the registered DNA data received is coincident with the DNA data this time and the other authentication data received is coincident with the other authentication data registered in advance.

In the determination of a genotype, the polymorphism of a nuclear DNA or that of a mitochondrial DNA is used. It is also possible to detect and analyze the base array of a cDNA complementary to the DNA or that of an RNA.

Figure 18:
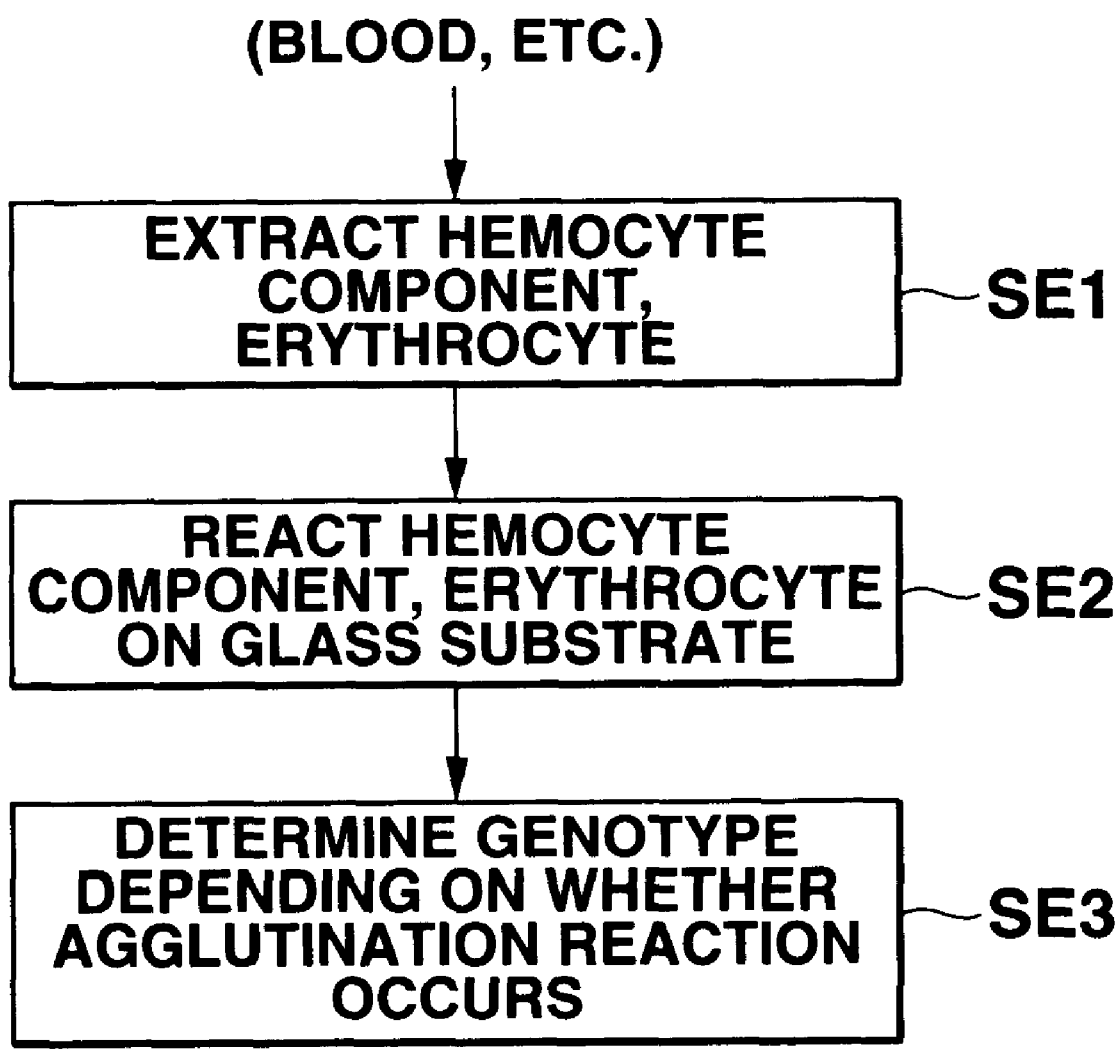
FIG. 18 is a flow chart showing procedures for determining a blood type.
Figure 19:
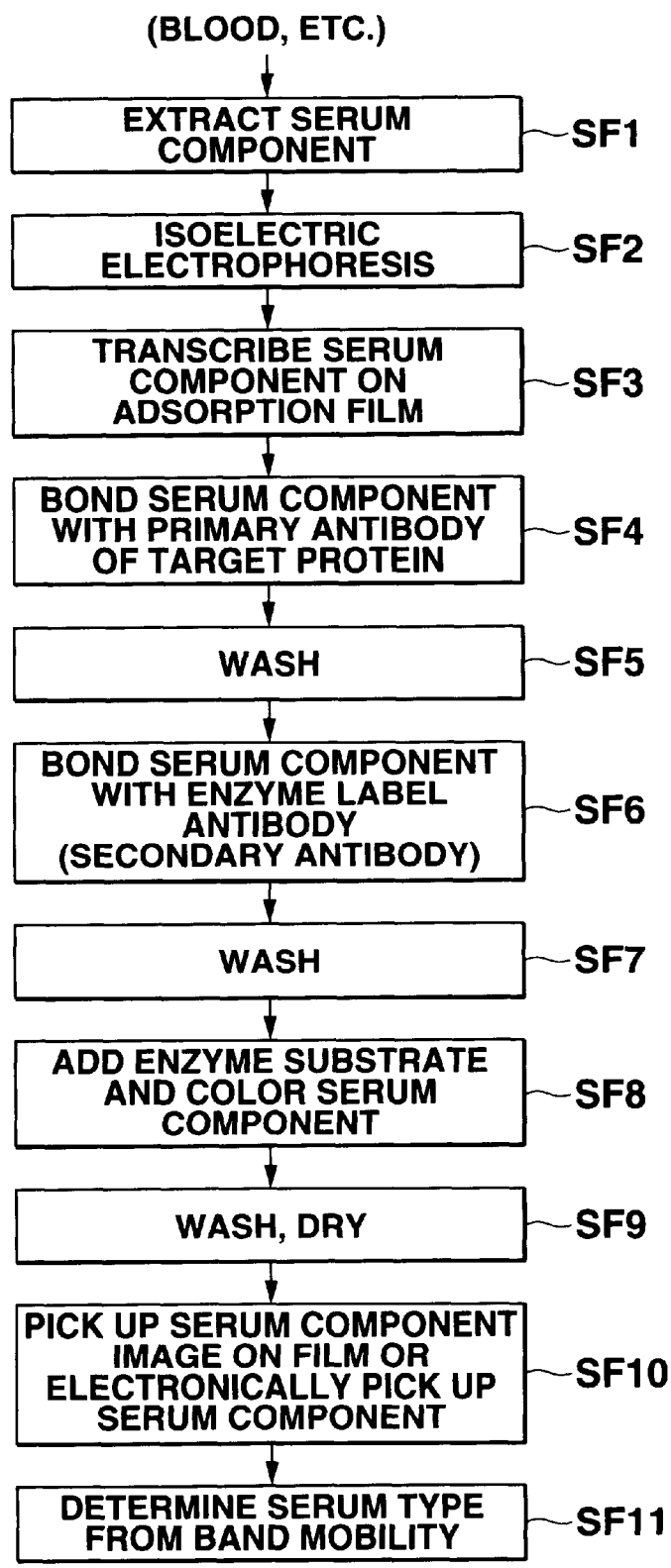
FIG. 19 is a flow chart showing another procedures for determining a blood type.

Further, if a blood type is used as authentication data, a determination may be made according to procedures shown in FIG. 18 or 19. Namely, according to the determination procedures shown in FIG. 18, a hemocyte component and erythrocyte are extracted first from blood or the like (in a step SE1), reacted with an antibody specific to a genotype on a glass substrate (in a step SE2) and the genotype is determined depending on whether an agglutination action occurs (in a step SE3).

According to the determination procedures shown in FIG. 19, a serum component is first extracted from blood or the like (in a step SF1). Next, a direct current is applied to polyacrylamide gel and the serum component is treated by isoelectric electrophoresis using alkali gel with a PH gradient (in a step SF2). Thereafter, after transcribed on an adsorption film (in a step SF3), the serum component is bonded to the primary antibody of a target protein (in a step SF4) and washed (in a step SF5). Further, the serum component is bonded to an oxygen label antibody (secondary antibody) (in a step SF6) and then washed (in a step SF7), and an oxygen substrate is added thereto to color the serum component (in a step SF8). The serum component is washed and dried (in a step SF9), an image thereof is picked up on a film or electronically picked up (in a step SF10), thereby determining a serum type from band mobility (in a step SF11)

Ninth Embodiment

Figure 20:
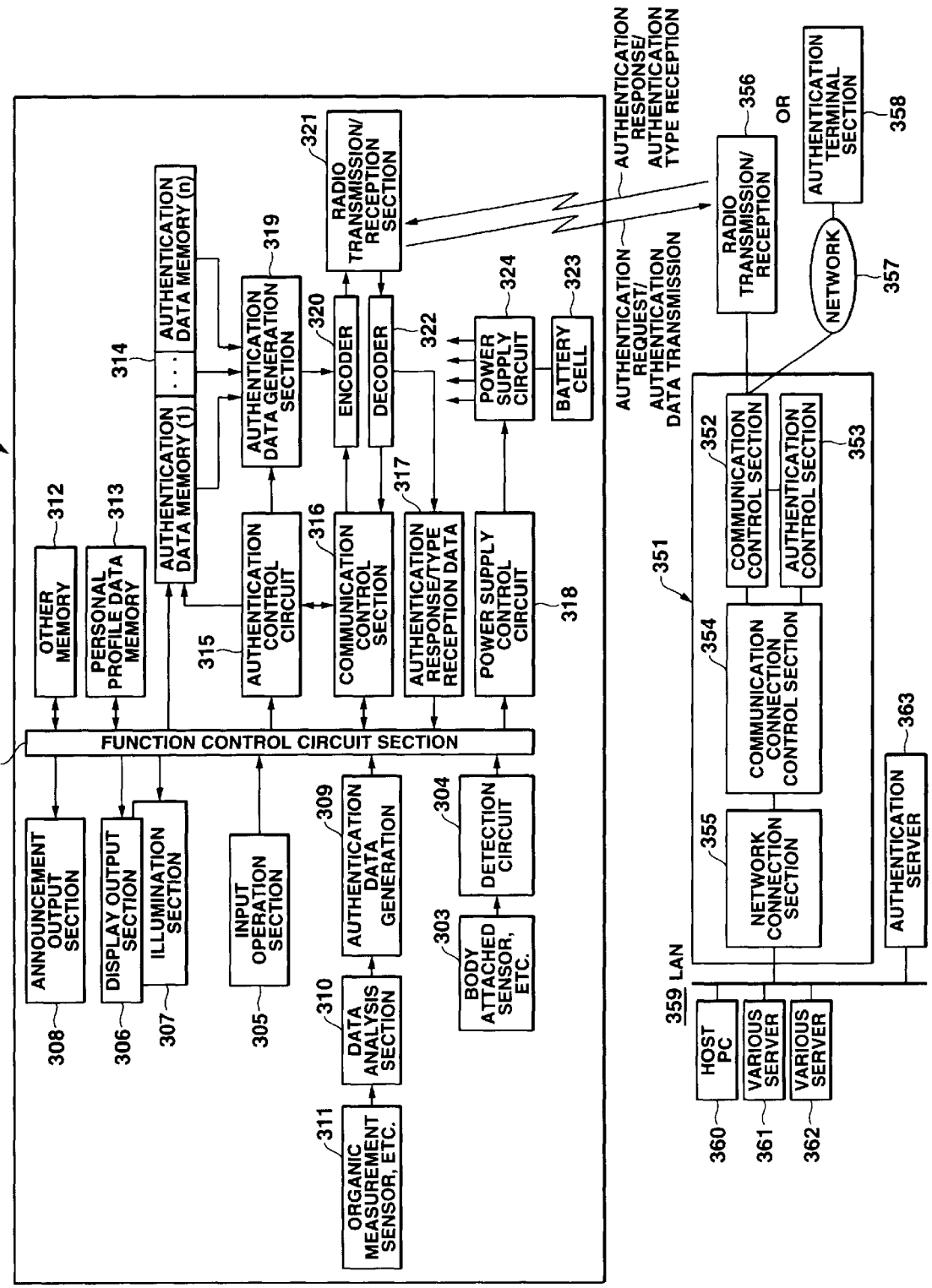
FIG. 20 is a block diagram showing the circuit arrangement and system configuration of a portable information equipment in the ninth embodiment according to the present invention.

FIG. 20 shows the ninth embodiment of the present invention. A portable information equipment 301 in this embodiment has a function control circuit section 302 controlling the respective constituent part of the equipment 301. An attached sensor 303 or the like is connected to the function control circuit section 302 through a detection circuit 304. In addition, an input operation section 305, a display output section 306, an illumination section 307 serving as a backlight of the display output section 306, an announcement section 308 and an authentication data generation block 309 are connected to the function control circuit section 302. The authentication data generation block 309 is also connected to an organic measurement sensor or the like 311 through a data analysis section 310. Further, other memories 312 and a personal profile data memory 313 as well as an authentication data memory group 314 including authentication data memories (1) to (n), an authentication control circuit 315, a communication control circuit 316, an authentication response/type reception data block 317 and a power supply control circuit 318 are connected to the function control circuit section 302.

The authentication data memory group 314 are memories storing therein authentication data required to connect the portable information equipment 301 to a LAN to be described later. The authentication data memories (1) to (n) store therein different types of authentication data, respectively. The authentication control circuit 315 conducts a data write processing and a data read processing to the authentication data memory group 314 and controls the authentication data generation section 319. The communication control circuit 316 controls an encoder 320 to encode the authentication data from the authentication data generation section 309 and radio-transmits the encoded data through a radio transmission/reception section 321. Further, a signal received by the radio transmission/reception section 321 is decoded by a decoder 322, inputted into the function control circuit section 302 through the communication control circuit 316 and announced by the announcement section 308 or displayed by the display output section 306. It is noted that among the data decoded by the decoder 308, reception data relating to the type of authentication response is fetched by the authentication response/type reception data block 317 and inputted into the function control circuit section 302. The power supply control circuit 308 controls a power supply circuit 324 connected to a battery 323 and supplies power to respective parts of the equipment 301.

On the other hand, a communication connection device (or remote access server) 351 has a communication control section 352 and an authentication control section 353, which are connected to each other, as well as a communication connection control section 354 connected to the sections 352 and 353, and a network connection section 355 connected to the communication connection control section 354. A radio transmission/reception section 356 is connected or an authentication terminal unit 358 is connected through a network 357, to the communication control section 352. The terminal unit 358 and the radio transmission/reception section 356 transmit and receive data to and from the radio transmission/reception section 321 of the portable information equipment 301.

Further, the network connection section 355 is connected to a LAN 359. The LAN 359 has a host PC 360, various servers 361, 362 and an authentication server 363. The authentication control section 353 is provided with a table 364 shown in FIG. 21. On this table 364, a plurality of ID areas 364a, authentication method areas 364b and registered data areas 364c are formed while making these areas correspond to one another. The ID areas 364a store therein respective users' ID's. The authentication method areas 364b store therein authentication methods for the users such as passwords, signatures, fingerprints, voiceprints and the like. The registered data areas 364c store therein the users' authentication registration data. Namely, the authentication methods different according to the reliability or the like of the respective users and the registration data corresponding to the authentication methods are stored in these areas while making the methods and the data correspond to the respective users' ID's.

In this embodiment constituted as stated above, the portable information equipment 301 operates according to a flow chart shown in FIG. 22A and the communication connection device 351 operates according to a flow chart show in FIG. 22B. That is, when an ID is transmitted from the radio transmission and reception section 321 of the portable information equipment 301 (in a step SG1), the radio transmission and reception section 351 at the communication connection device 351 side receives the transmitted ID, and the ID is fetched from the communication control section 352 (in a step SH1). Thereafter, the received ID is retrieved in the ID areas 364a on the table 364 and an authentication method corresponding to the retrieved ID is selected from the authentication method areas 365b (in a step SH2). Next, the selected authentication method is transmitted and outputted from the radio transmission and reception section 356 (in a step SH3).

Following this, the radio transmission/reception section 321 of the portable information equipment 301 receives the transmitted authentication method (in a step SG2). The received authentication method is fetched in the function control circuit section 302 through the decoder 322 and the communication control circuit 316 and displayed on the display output section 306 (in a step SG3). Accordingly, by visually recognizing the display output section 306, the user can know which authentication data is to be inputted to receive a service.

If the user inputs authentication data corresponding to the received authentication method by input operation in the input operation section 305 or detection operation in the organic measurement sensor or the like, the function control circuit section 302 fetches the authentication data (in a step SG4). The inputted authentication data is compared with authentication data stored in any one of the authentication data memories (1) to (n) in the authentication data memory group 314 to determine whether the both data are coincident with each other, and then transmitted from the radio transmission and reception section 321 through the authentication data generation section 319 and the encoder 320 (in a step SG5).

In response to this, at the communication connection device 351 side, the radio transmission and reception section 356 receives and fetches the transmitted authentication data in the communication control section 352 (in a step SH4). Thereafter, the authentication control section 353 collates the registration data stored in the corresponding registration data area 364c on the table 364 with the received authentication data (in a step SH5). Based on the collation result, connection to the various servers is permitted or rejected.

In other words, in this embodiment, it is possible to conduct authentication by using the different authentication methods among the users according to the reliability or the like of the users and to thereby suppress users from illegally utilizing services.

Conversely, the system may be constituted so that the portable information equipment 301 transmits a plurality of possible authentication methods and the communication connection device 351 or the authentication server receiving the methods transmits a response indicating which authentication method is to be adopted or that the both sides negotiate with each other as to an authentication protocol to be used.

Tenth Embodiment

Figure 23:
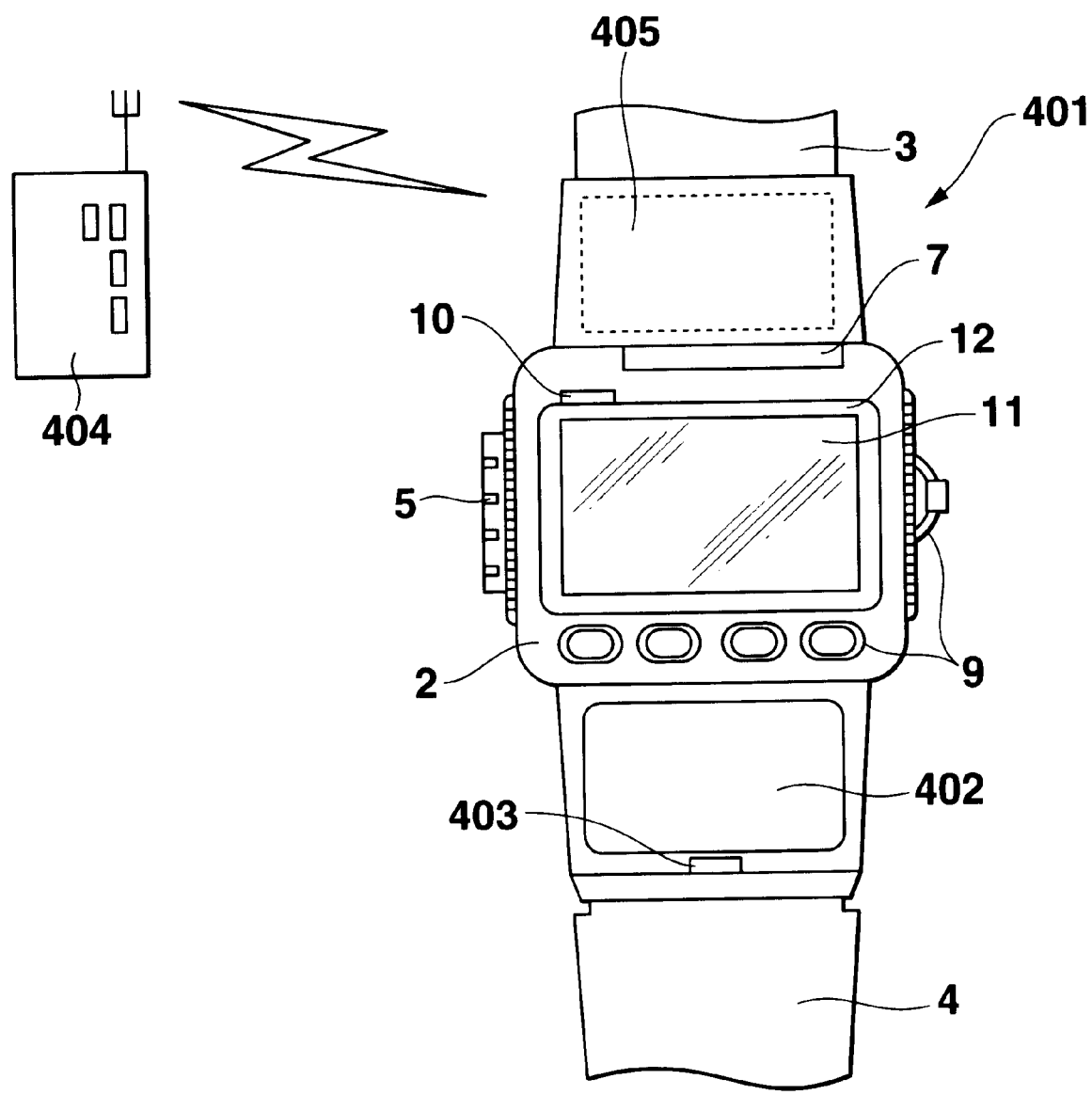
FIG. 23 shows the outer configuration of portable information equipment in the tenth embodiment according to the presents invention.

FIG. 23 shows the outer configuration of the tenth embodiment of the present invention. An mobile communication terminal function is incorporated into a portable information equipment. That is, portable information equipment 401 comprises a clock case 2 and list bands 3, 4 coupled to the both end portions of the clock case 2 as in the case of the portable information equipment 1 shown in FIG. 1. Further, the portable information equipment 401 is the same as the equipment 1 in that the clock case 2 is provided with a serial input/output terminal section 5, an infrared communication section 7, a microphone 10, an operation section 9, a display section 11 and a holograph/signature input section 12. Differently from the equipment 1, however, the portable information equipment 401 is provided with an organic authentication sensor section 402 and a speaker 403 on one end of the clock case 2 and with an antenna section & mobile communication section 405 communicating with a base station on the other end of the clock case 2.

Figure 24:
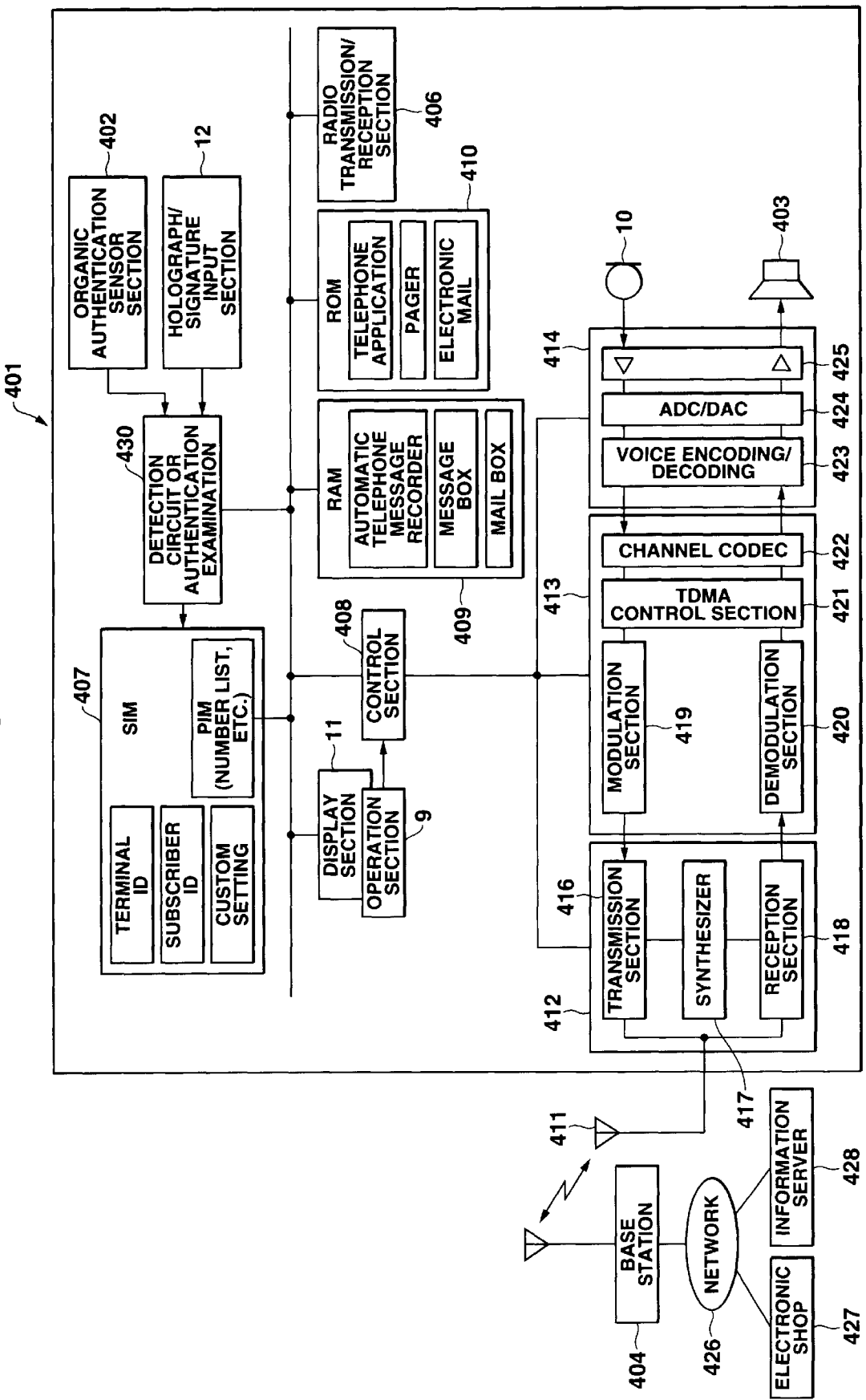
FIG. 24 is a block diagram showing the system configuration in the tenth embodiment.

FIG. 24 is a block diagram showing the circuit arrangement of the portable information equipment 401. As shown therein, the portable information equipment 401 has the organic authentication sensor section 402, the holograph/signature input section 12, and the detection circuit or authentication examination block 430 as well as a radio transmission/reception section 406, an SIM (Subscriber Identity Module) section 407, the display section 11, the operation section 9, a control circuit 408, an RAM 409 and an ROM 410. The SIM section 407 stores therein data on a terminal ID, a subscriber ID, a custom setting as well as a PIM (Personal Information Manager). The RAM 409 is used as an automatic message recorder, a message Box and a mail Box. The ROM 410 stores therein programs for a telephone, a pager and electronic mail. The mobile communication terminal incorporated into this portable information equipment 401 is a PHS (Personal Handyphone System) which comprises an antenna 411, a transmission/reception section 412, a communication control section 413, a voice processing system 414, a microphone 10 and a speaker 403. The transmission/reception section 412 comprises a transmitter section 416, a synthesizer 417 and a receiver section 418. The communication control section 413 comprises a modulation section 419, a demodulation section 420, a TDMA (Time Division Multiple Access) control section 421 and a channel CODEC 422. The voice processing section 414 comprises a voice encoding/decoding section 423, an AD/DA converter 424 and an amplifier 425.

The base station 404 is connected to an electronic shop 427 or an information server 428 through a network 426.

Namely, the portable information equipment 401 in this embodiment is a watch-type communication terminal which is an equipment having a combination of a mobile communication function and an authentication function. Even with the portable information equipment 401, it is possible to selectively use one of electronic authentication data such as a password and a hologram or signature and organic data detected by an organic authentication sensor section 402, for purchasing merchandise in electronic shops or authenticating a subscriber, a user himself, accounting or the like required when receiving information services from the information server 428.

Eleventh Embodiment

Figure 25:
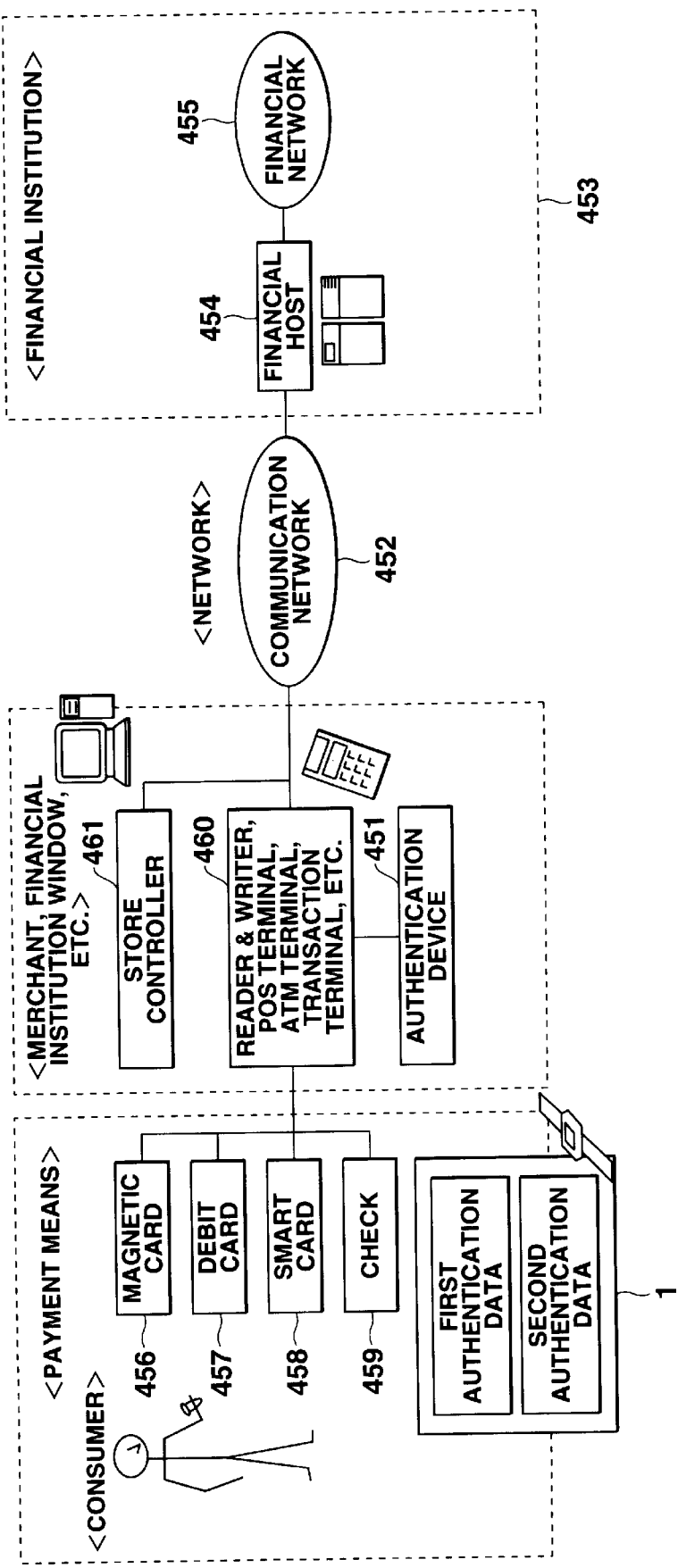
FIG. 25 is a schematic diagram showing the system configuration in the eleventh embodiment according to the present invention.

FIG. 25 shows the eleventh embodiment of the present invention. In this embodiment, the present invention is applied to electronic settlement and network settlement. Namely, a portable information equipment 1 having the same constitution as that in the first embodiment, transmits and receives data to and from an authentication device 451 provided in a shop or the window of a financial institution 453, and connects to the financial host 454 of the financial institution 453 or a financial network through a network 452. Thereafter, under the control of a store controller 461, information on various cards and a check 456 to 459 are supplied through the network 452 to the financial host 454 of the financial institution 453 or to the financial network 455 from a reader & writer and the like 460, and electronic settlement is made. At this moment, if the first authentication data and the second authentication data which differ in authentication method are used between a consumer and the authentication device 451 for authentication, it is possible to make the data correspond to the authentication device 451 provided in a shop or the window of the financial institution.

Twelfth Embodiment

FIG. 26 shows the twelfth embodiment of the present invention. In this embodiment, the present invention is applied to pendant-type portable information equipment. This portable information equipment 501 consists of an equipment main body 502 and a pair of chains each having one end coupled to the upper end portion of the equipment main body 502. An authentication data transmission/reception section 504, an organic authentication sensor/input section 505 and a plurality of keys 506 are provided on the front surface of the equipment main body 502. Further, a body attached sensor 13 is arranged on the rear surface of the equipment main body 502. As in the case of the first embodiment, the body attached sensor 13 comprises an infrared LED 13*a* and an infrared photo-sensor 13*b* which are provided to be adjacent each other. In addition, a body attached switch 507 is provided on the tip end portions of the chains 503 and 503. This body attached switch 507 comprises a switch which is turned on when connected to a pair of connectable hooks 508 detachably provided on the tip end portions of the chains 503 and 503.

Figure 27:
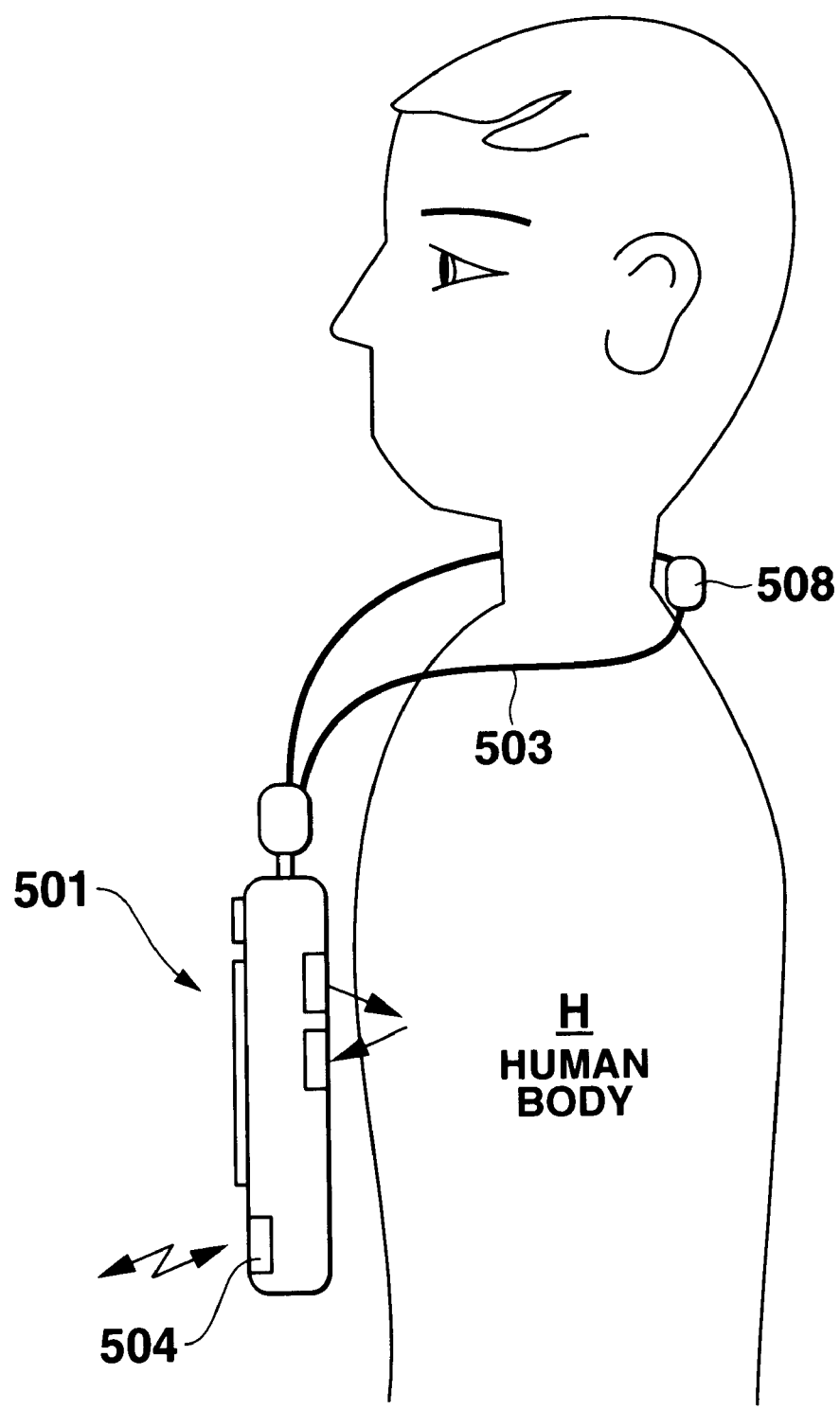
FIG. 27 is a view showing a state in which the portable information equipment is attached to a human body in the twelfth embodiment.

With this constitution, if the chains 503 are connected to the hooks 508, respectively, so as to form a ring shape, the body attached switch 507 is turned on as show in FIG. 27. Further, if the chains 503 are put on the neck while the rear surface side of the equipment main body 502 faces a human body H, an infrared light beam from the infrared LED 13*a* is reflected on the human body H and received by the infrared photo-sensor 13*b*, thereby turning on the body attached sensor 13. Accordingly, if a processing is executed in the condition that the body attached switch 507 and the body attached sensor 13 are turned on, it is possible to avoid the possibility that the processing is unnecessarily executed when the sensor and the switch are not attached to the human body.

Thirteenth Embodiment

Figure 28A:
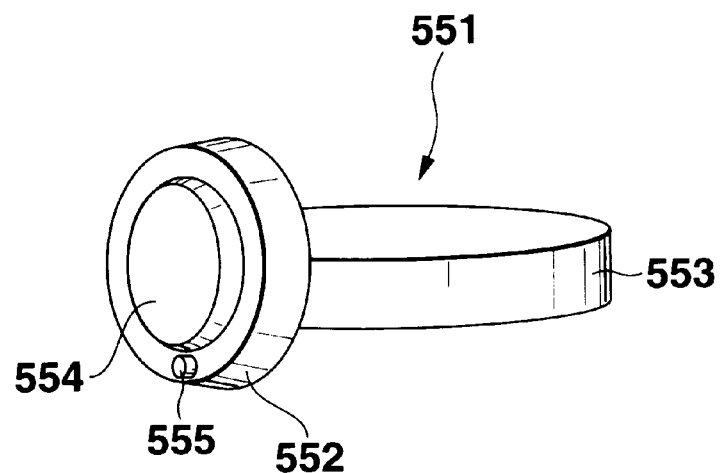
FIG. 28A is a perspective view showing portable information equipment in the thirteenth embodiment according to the present invention.
Figure 28B:
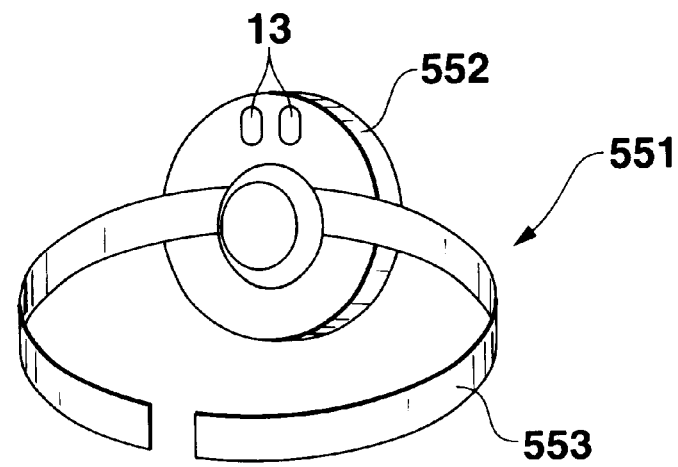
FIG. 28B is a perspective view from another direction showing the portable information equipment in the thirteenth embodiment according to the present invention.
Figure 28C:
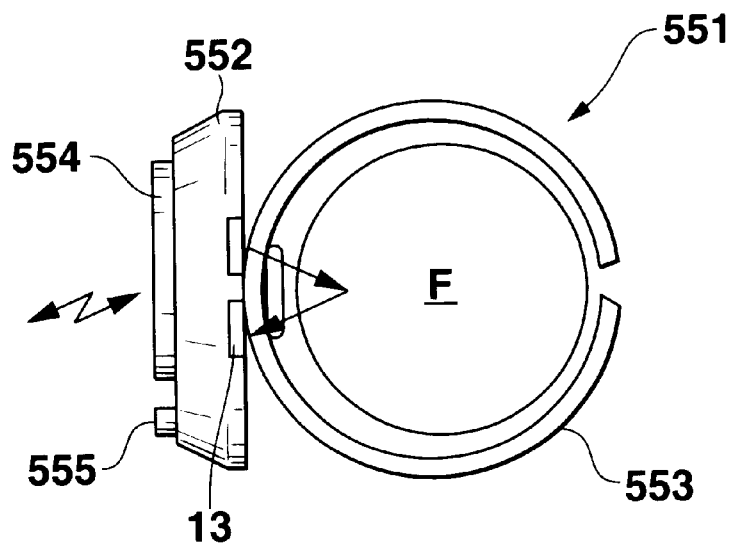
FIG. 28C is a view showing a state in which the portable information equipment is attached in the thirteenth embodiment according to the present invention.

FIG. 28 shows the thirteenth embodiment of the present invention. In this embodiment, the present invention is applied to ring-type portable information equipment. This portable information equipment 551 comprises an equipment main body 552 and a ring 553 having one end connected to the rear surface of the equipment main body 552. An organic authentication data input section 554 for data such as a fingerprint and an authentication data transmission/reception section 555 are provided on the front surface of the equipment main body 552. A body attached sensor 13 is arranged on the rear surface of the main body 552 as in the case of the first embodiment.

In this embodiment, if the ring 553 is attached to a finger F, the ring 553 functions as a body attached sensor 13. Accordingly, if a processing is executed in the condition that the body attached sensor 13 is turned on, it is possible to avoid the possibility that the processing is unnecessarily executed when the sensor is not attached to the body.

Fourteenth Embodiment

Figure 29:
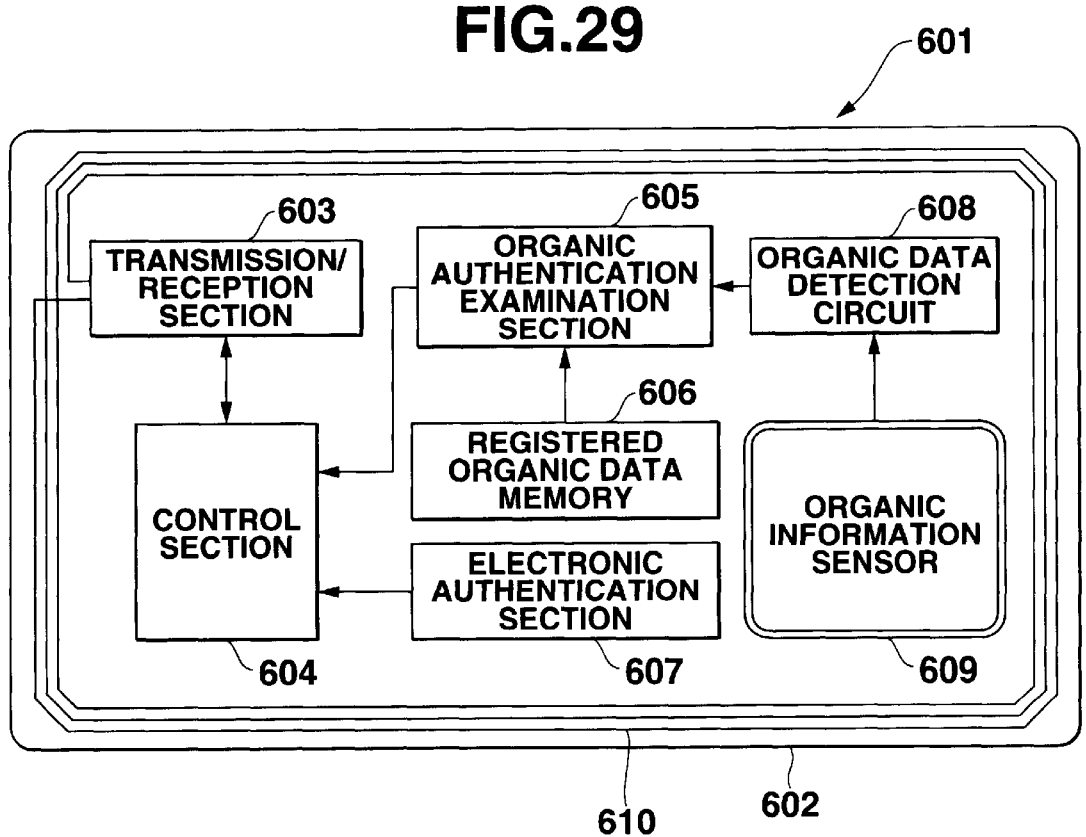
FIG. 29 is a front view showing portable information equipment in the fourteenth embodiment according to the present invention.

FIG. 29 shows the fourteenth embodiment of the present invention. In this embodiment, the present invention is applied to card-type portable information equipment. This portable information equipment 601 has a card main body 602 on which a transmission/reception section 603, a control section 604, an organic authentication examination section 605, a registered organic data memory 606, an electronic authentication section 607, an organic data detection circuit 608 and an organic information sensor 609 are arranged. Also, a non-contact communication (electromagnetic induction) antenna coil 610 is annually arranged on the periphery of the card main body 602. The both end portions of the antenna coil 610 are connected to the transmission/reception section 603.

Namely, this portable information equipment 601 is such a type as to communicate with an authentication device by an electromotive force generated on the antenna coil 610 when approaching the authentication device. Accordingly, by arranging the antenna coil 610 on the periphery of the card main body 602, it is possible to make the antenna coil 610 larger in size and to thereby enhance communication performance.

Fifteenth Embodiment

Figure 30:
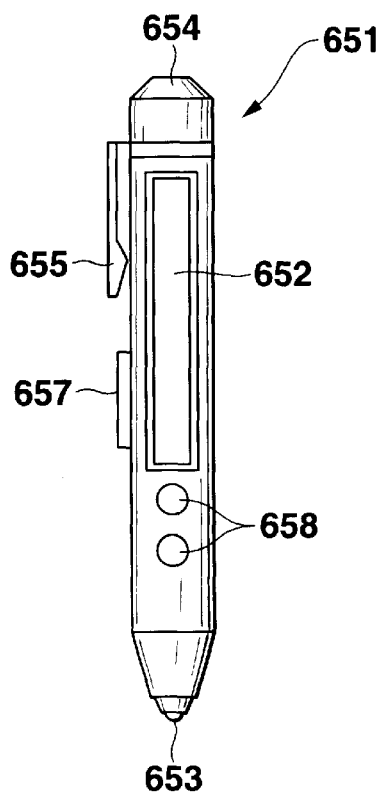
FIG. 30 is a front view showing portable information equipment in the fifteenth embodiment according to the present invention.

FIG. 30 shows the fifteenth embodiment of the present invention. In this embodiment, the present invention is applied to pen-type portable information equipment. This portable information equipment 651 has a pen main body 652. A writing section 653 having a tip end of a ball-point pen is provided on one end portion of the pen main body 652, and an authentication data transmission/reception section 654 is provided on the other end of the body 652. A clip 655 is provided to protrude on the periphery of the pen main body 652 and a display section 656, a fingerprint sensor section 657 and an operation switch section 658 are provided on the periphery thereof, as well.

According to this embodiment, it is possible to detect fingerprint data by pushing a finger against the fingerprint sensor 657 as if gripping a pen, thereby facilitating detection of fingerprint data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. Portable information equipment comprising:

a plurality of authentication data input sections;

a reception section configured to receive data for designating one of the plurality of authentication data input sections that is designated by a market price; and a transmission section configured to transmit data input by said designated one of said authentication data input sections.

2. The portable information equipment according to claim 1, comprising a manifestation section configured to notify a user which said designated one of said authentication data input sections is to be used.

3. The portable information equipment according to claim 1, wherein one of said plurality of authentication input sections is a fingerprint data input section.

4. The portable information equipment according to claim 1, wherein one of said plurality of authentication input sections is a DNA data input section.

5. The portable information equipment according to claim 1, wherein one of said plurality of authentication input sections is a voiceprint data input section.

6. The portable information equipment according to claim 1, wherein one of said plurality of authentication input sections is a signature data input section.

7. The portable information equipment according to claim 1, further comprising a case in which the plurality of authentication data input sections and the reception section are contained, and a band for wearing the case on the arm of a user.

8. An authentication system having portable information equipment and an authentication device, the portable information equipment comprising:

a plurality of authentication data input sections;

a reception section configured to receive data for designating one of said plurality of authentication data input sections; and a transmission section configured to transmit the data input from said designated one of said authentication data input sections, and the authentication device comprising:

a transmission section configured to transmit the data for designating the one of said authentication data input sections that is designated by a market price to said portable information equipment;

a reception section configured to receive the data input from said designated one of said authentication input sections and transmitted from said portable information equipment; and a collation section configured to collate the data received by the reception section with data registered in advance.

9. The authentication system according to claim 8, wherein said portable information equipment has a manifestation section configured to notify a user which said designated one of said authentication data input sections is to be used.

10. The authentication system according to claim 8, wherein said plurality of authentication data input sections includes a fingerprint data input section.

11. The authentication system according to claim 8, wherein one of said plurality of authentication data input sections includes a DNA data input section.

12. The authentication system according to claim 8, wherein said plurality of authentication data input sections includes a voiceprint data input section.

13. The authentication system according to claim 8, wherein said plurality of authentication data input section includes a signature data input section.

14. The portable information equipment according to claim 8, further comprising a case in which the plurality of authentication data input sections and the reception section are contained, and a band for wearing the case on the arm of a user.

15. A method of authenticating an individual, comprising the steps of:

receiving data for designating one of a plurality of authentication data input sections on the basis of a market price; and transmitting authentication data input from the one of said authentication data input sections that is designated by said received data.

16. The method according to claim 15, further comprising the step of:

manifesting said designated one of said authentication data input sections based on said received data.

17. A program storage medium having computer readable program codes for authenticating an individual, comprising:

program code means for receiving data for designating one of a plurality of authentication data input sections on the basis of a market price; and program code means for transmitting authentication data input from thie one of said authentication data input sections that is designated by said received data.

18. The program storage medium according to claim 17, further comprising:

program code means for manifesting said designated one of said authentication data input sections based on said received data.

* * * * *